(12) United States Patent
Nygaard et al.

(10) Patent No.: US 11,045,842 B2
(45) Date of Patent: Jun. 29, 2021

(54) METHOD AND SYSTEM FOR INSPECTING UNIDENTIFIED MIXED PARTS AT AN INSPECTION STATION HAVING A MEASUREMENT AXIS TO IDENTIFY THE PARTS

(71) Applicant: General Inspection, LLC, Davisburg, MI (US)

(72) Inventors: Michael G. Nygaard, Grand Blanc, MI (US); Nathan Andrew-Paul Kujacznski, Swartz Creek, MI (US); Christopher Michael Alexander, Fenton, MI (US); Laura L. Poletti, Grand Blanc, MI (US); Gregory M. Nygaard, Clarkston, MI (US); James W. St. Onge, Bloomfield Hills, MI (US)

(73) Assignee: General Inspection, LLC, Davisburg, MI (US)

( * ) Notice: Subject to any disclaimer, the term of this patent is extended or adjusted under 35 U.S.C. 154(b) by 219 days.

(21) Appl. No.: 16/413,696

(22) Filed: May 16, 2019

(65) Prior Publication Data
US 2020/0360968 A1 Nov. 19, 2020

(51) Int. Cl.
*B07C 5/34* (2006.01)
*G06T 7/00* (2017.01)
*B64F 5/60* (2017.01)

(52) U.S. Cl.
CPC .......... *B07C 5/3416* (2013.01); *G06T 7/0004* (2013.01); *B64F 5/60* (2017.01)

(58) Field of Classification Search
CPC .......... B07C 5/3416; B07C 5/342; B07C 5/34; G06T 7/0004; G06T 7/001
See application file for complete search history.

(56) References Cited

U.S. PATENT DOCUMENTS

| | | | |
|---|---|---|---|
| 4,869,813 A | 9/1989 | Bailet | |
| 5,291,645 A * | 3/1994 | Aoyama | B23P 19/006 29/240 |
| 6,324,298 B1 * | 11/2001 | O'Dell | G01N 21/9501 257/E21.53 |
| 7,403,872 B1 | 7/2008 | St. Onge et al. | |
| 7,633,046 B2 | 12/2009 | Spalding | |
| 7,633,634 B2 | 12/2009 | Spalding et al. | |

(Continued)

*Primary Examiner* — Patrick H Mackey
(74) *Attorney, Agent, or Firm* — Brooks Kushman P.C.

(57) ABSTRACT

A method and system for inspecting unidentified mixed parts to identify the parts are provided. The system includes an inspection station which includes a vision-based robotic subsystem including a robot configured to pick up a self-supporting part and place the part on a fixtureless rotary stage so that a part axis of the part is substantially centered and aligned with a measurement axis of the inspection station during part rotation. A second subsystem optically measures a profile and features of the self-supporting part during part rotation. A processor is operable to compare the profile and the features of the part to be identified with the profile and corresponding features of stored templates to identify a template which matches the profile and features of the part to be identified and to generate and transmit an identification signal representing a part identification code for the part associated with a matched template.

24 Claims, 28 Drawing Sheets

(56) References Cited

U.S. PATENT DOCUMENTS

| | | |
|---|---|---|
| 7,633,635 B2 | 12/2009 | Nygaard et al. |
| 7,684,054 B2 | 3/2010 | Crowther |
| 7,738,088 B2 | 6/2010 | Spalding |
| 7,738,121 B2 | 6/2010 | Spalding |
| 7,755,754 B2 | 7/2010 | Spalding |
| 7,777,900 B2 | 8/2010 | Nygaard et al. |
| 7,796,278 B2 | 9/2010 | Spalding et al. |
| 7,812,970 B2 | 10/2010 | Nygaard |
| 7,907,267 B2 | 3/2011 | Spalding |
| 7,920,278 B2 | 4/2011 | Nygaard |
| 8,004,694 B2 | 8/2011 | Lee et al. |
| 8,013,990 B2 | 9/2011 | Spalding |
| 8,132,802 B2 | 3/2012 | Kolodge et al. |
| 8,237,935 B2 | 8/2012 | Nygaard et al. |
| 8,390,826 B2 | 3/2013 | Walstra |
| 8,416,403 B2 | 4/2013 | Nygaard |
| 8,550,444 B2 | 10/2013 | Nygaard et al. |
| 8,570,504 B2 | 10/2013 | Nygaard |
| 8,896,844 B2 | 11/2014 | Nygaard et al. |
| 8,977,035 B2 | 3/2015 | Dalla-Torre et al. |
| 8,993,914 B2 | 3/2015 | Kujacznski et al. |
| 9,019,489 B2 | 4/2015 | Nygaard |
| 9,047,657 B2 | 6/2015 | Nygaard |
| 9,228,957 B2 | 1/2016 | Kujacznski et al. |
| 9,370,799 B2 | 6/2016 | Nygaard et al. |
| 9,372,077 B2 | 6/2016 | Fleming et al. |
| 9,372,160 B2 | 6/2016 | Nygaard |
| 9,377,297 B2 | 6/2016 | Fleming et al. |
| 9,486,840 B2 | 11/2016 | Nygaard |
| 9,539,619 B2 | 1/2017 | Kujacznski et al. |
| 9,558,544 B2 * | 1/2017 | Truong .................. G07D 5/005 |
| 9,575,013 B2 | 2/2017 | Nygaard et al. |
| 9,697,596 B2 | 7/2017 | Nygaard et al. |
| 10,207,297 B2 | 2/2019 | Nygaard et al. |
| 10,209,200 B2 | 2/2019 | Nygaard et al. |
| 10,300,510 B2 | 5/2019 | Kujacznski et al. |
| 10,733,723 B2 * | 8/2020 | Diao .................... G06K 9/6206 |
| 2006/0102839 A1 * | 5/2006 | Bhaskar ................ G06T 7/0004 |
| | | 250/310 |
| 2008/0029596 A1 * | 2/2008 | Nygaard ................ G06K 17/00 |
| | | 235/383 |
| 2014/0267691 A1 * | 9/2014 | Humphrey ........... G06T 7/0008 |
| | | 348/125 |
| 2017/0249729 A1 * | 8/2017 | Greene .................. G06T 7/001 |
| 2018/0005365 A1 * | 1/2018 | Kimura ................. B25J 9/0087 |
| 2020/0363342 A1 * | 11/2020 | Nygaard ................ B07C 5/362 |

* cited by examiner

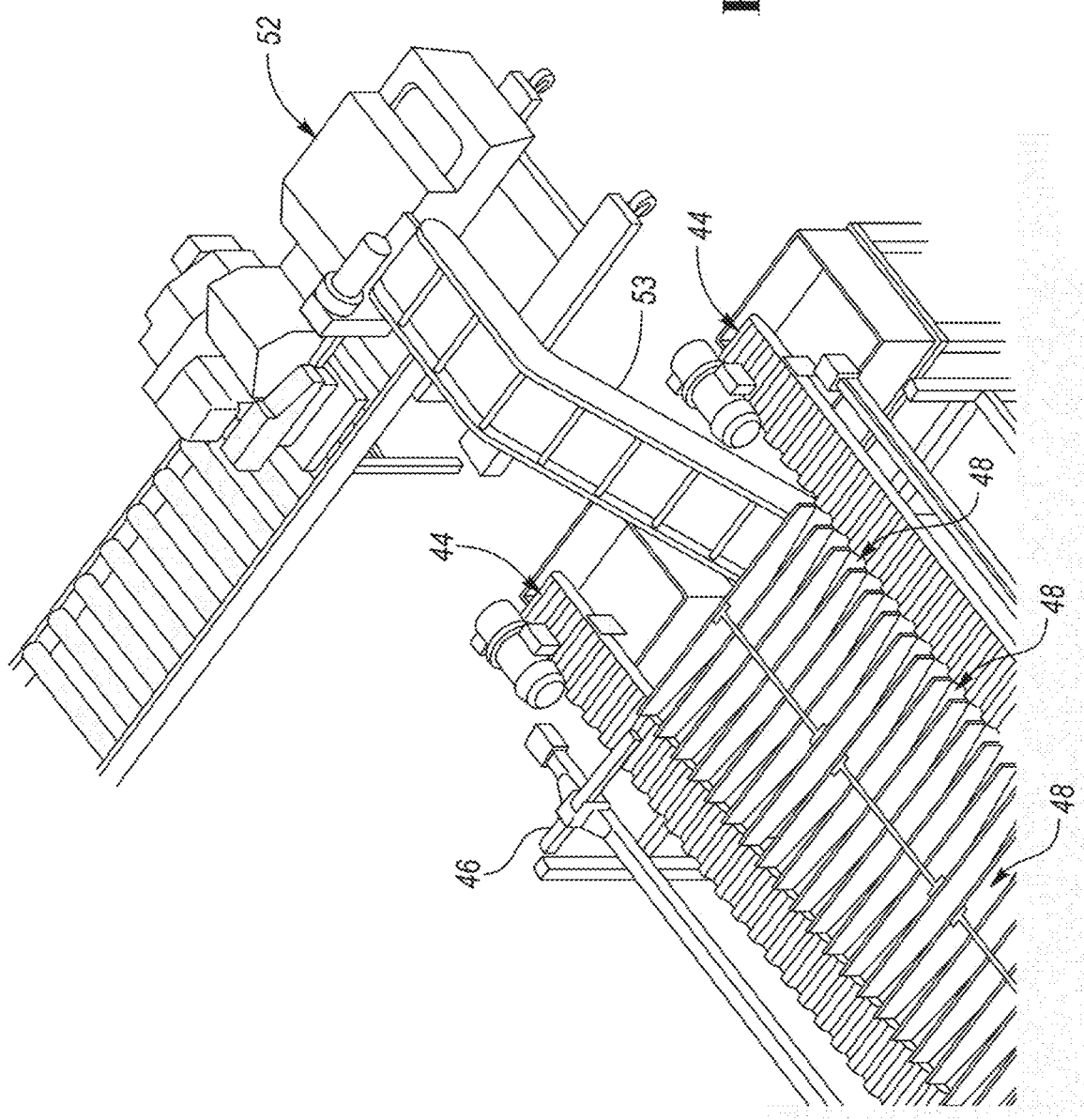

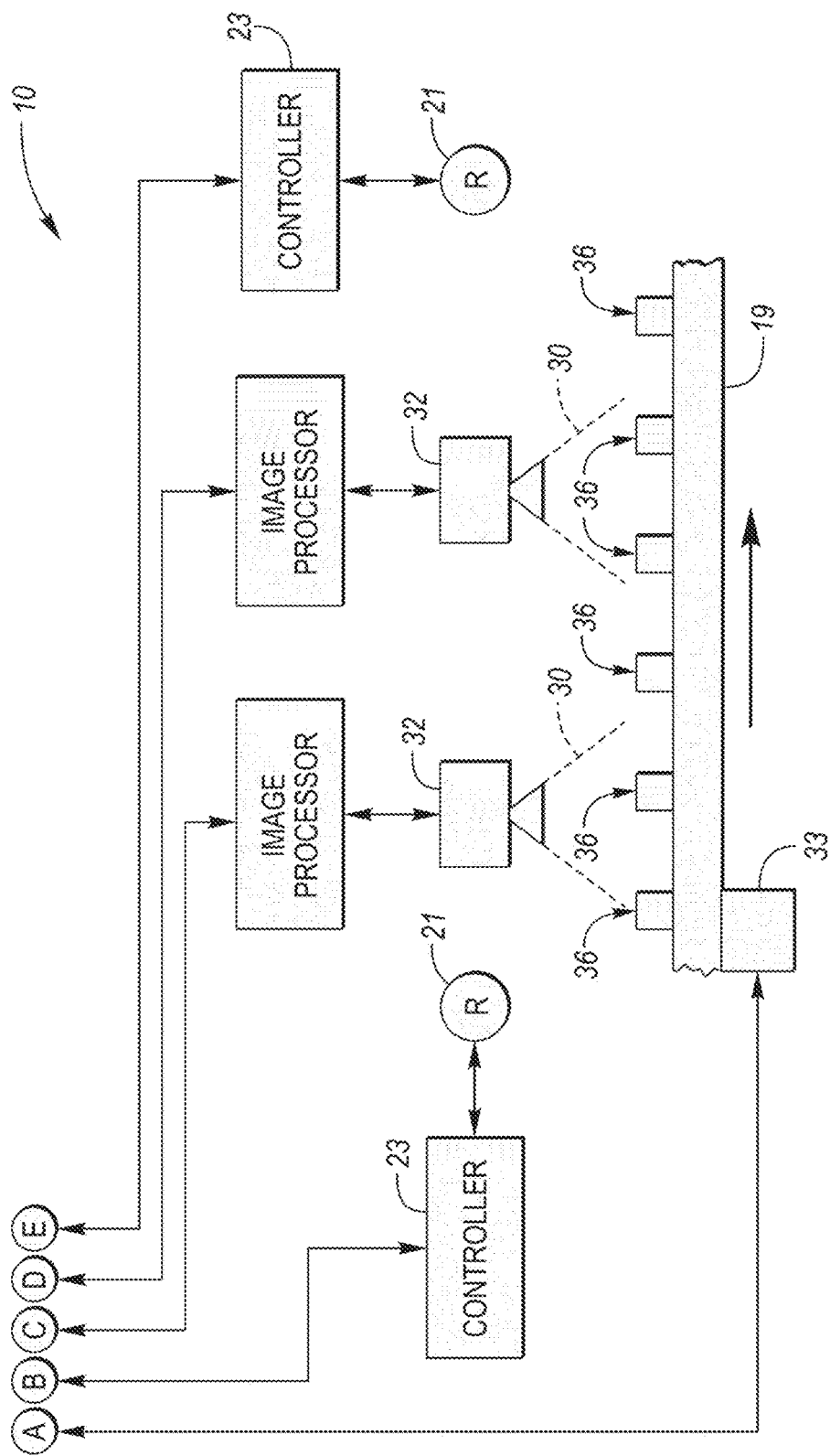

| Dimension Explanation | ØD Shank Diameter | | Grip 2nd dash | | | H Head Length | | Grip (Calculates Actual Grip) | |
|---|---|---|---|---|---|---|---|---|---|
| Full Part Number | Tolerance | Min | Nominal | Max | Min | Max | Nominal | Max | |
| example | 5 | .1625-.1635 | 1.9950 | 2 | 2.0050 | 0.0370 | 0.0470 | 0.1250 | 0.1253 |
| example | 5 | .1625-.1635 | 3.9950 | 4 | 4.0050 | 0.0370 | 0.0470 | 0.2500 | 0.2503 |
| example | 5 | .1625-.1635 | 5.9950 | 6 | 6.0050 | 0.0370 | 0.0470 | 0.3750 | 0.3753 |
| example | 5 | .1625-.1635 | 6.9950 | 7 | 7.0050 | 0.0370 | 0.0470 | 0.4375 | 0.4378 |

| T or TL Thread Length | Total Length (Calculates Overall ") | | | ØA Head Diameter | | | AA Thread Size | ØTD Thread Major Diameter | | | HT Head Type |
|---|---|---|---|---|---|---|---|---|---|---|---|
| Nominal | Min | Nominal | Max | Min | Nominal | Max | | Min | Nominal | Max | |
| 0.2800 | 0.4417 | 0.4470 | 0.4523 | 0.2420 | 0.2520 | 0.2620 | .1640-32 | 0.1570 | 0.1583 | 0.1595 | Flat Head |
| 0.2800 | 0.5667 | 0.5720 | 0.5773 | 0.2420 | 0.2520 | 0.2620 | .1640-32 | 0.1570 | 0.1583 | 0.1595 | Flat Head |
| 0.2800 | 0.6917 | 0.6970 | 0.7023 | 0.2420 | 0.2520 | 0.2620 | .1640-32 | 0.1570 | 0.1583 | 0.1595 | Flat Head |
| 0.2800 | | 0.7595 | | 0.2420 | | 0.2620 | .1640-32 | 0.1570 | | 0.1595 | Flat Head |

FIG. 21

Example: Shank Diameter

Example: Shank Length

Example: Head Diameter

Example: 3 Wire Thread Modeling Method

Example: Thread Anchor

Example: Thread Features

METHOD AND SYSTEM FOR INSPECTING UNIDENTIFIED MIXED PARTS AT AN INSPECTION STATION HAVING A MEASUREMENT AXIS TO IDENTIFY THE PARTS

CROSS-REFERENCE TO RELATED APPLICATIONS

This application is related to U.S. patent applications entitled "Computer-Implemented Method of Automatically Generating Inspection Templates of a Plurality of Known Good Fasteners" and "High-Speed Method and System for Inspecting and Sorting a Stream of Unidentified Mixed Parts" both of which are filed on the same day as this application.

TECHNICAL FIELD

At least one embodiment of the present invention generally relates to non-contact methods and systems for identifying mixed parts and, in particular, to optical methods and systems for identifying unidentified mixed parts at an inspection station.

OVERVIEW

Aircraft Construction

In the world of aircraft construction and repair, aircraft fasteners are utilized to assembly detail parts that are combined together with other parts into assemblies, which are assembled into installations that finally end up as a complete aircraft. Typical threaded and non-threaded fasteners used in the aerospace industry are illustrated in FIG. 1.

As used herein, the term "fastener" refers to a hardware device that mechanically joins or affixes two or more structures together. For example, a fastener may join two or more structures together. A fastener includes, for example, without limitation, a bolt a nut, a stud, a screw, a rivet, a washer, a lock washer, and other suitable elements.

Fastener information may be found in various sources which may include the specific aircraft maintenance manual, the specific aircraft structural repair manual, or aircraft production and repair drawings.

Fastener Utilization and Types

When engineers design an aircraft many things are considered when choosing the correct type of fastener. The type of joint the fastener will be exposed to in its application; the shear or tension. What types of loads will be transferred through the joint. Aircraft loads may include those experienced during towing, normal flight operations, wind-gusts, pressurization, engine-out operations, landing, and more. All of this will determine how thick or thin the structure will have to be, the material type of the original structure, and the associated fasteners.

Fasteners must be able to achieve the transfer of load from one part to another. An example of this is the load transferred from an engine to a pylon, the pylon load to the wing, and the wing to fuselage. Fastener numbers and diameter are calculated to transfer this load. Other criteria are also needed to select the best fastener for the installation. This could include weight, inspect ability, tooling requirements, aerodynamic smoothness, access, corrosion protection, and of course cost.

Fasteners can be placed into many groupings which may be used as structural fasteners that take aircraft loads, to nonstructural fasteners that connect non-load bearing parts.

There are restricted access applications or blind fasteners such a Huck Lock Bolts, Composi-Locks Fasteners, and CherryMAX fasteners.

For areas with access to both sides, standard rivets, structural bolts, and Hi-Lok fastening system fasteners are used. Materials for these fasteners include aluminum, steel, and titanium and are coated to prevent dissimilar metal corrosion. Styles of fastener heads vary from countersunk to protruding head based on the aerodynamic requirements of the aircraft.

Fastener Codes and Orientation

Fastener coding can be designated by the fastener manufacturer such as a CR 3233 CherryMAX rivet, by an industry standard such as AN4 bolt, or by the airframe manufacturer as in a BACR15CE5D3 rivet from Boeing. Coding descriptions can be found in various fastener books, on the repair drawing, or on the production blueprint. Also, fastener codes may be used to simplify repair and productions drawings.

It is standard for the head of a fastener to be installed head-up, or head-forward. However, the blueprints and repair drawing will give proper orientation in the fastener quadrant, and will call-out the fastener head near or far based on the view of the drawing.

One problem associated with fasteners such as aerospace fasteners is that they become decertified and/or are mixed up with other fasteners. Many of those fasteners can be used after being recertified and, subsequently, re-introduced into inventory, thereby eliminating waste.

Traditional manual, gauging devices and techniques have been replaced to some extent by automatic inspection methods and systems. For example, gage wires are utilized in physical thread measurements of pitch diameter in the prior art. Two wires are placed in adjacent threads on one side of the UUT, and a single wire is placed on the other side of the UUT. A micrometer measures the distance between the reference line established by the two adjacent gage wires and the reference point established by the other gage wire. A tabulated correction formula converts the micrometer distance to an estimate of the pitch diameter. As in the readily appreciated, such inspection can be tedious, time consuming and prone to human error.

U.S. Pat. No. 7,633,635 discloses a method and system for automatically identifying non-labeled, manufactured parts. The system includes an electronic storage device to store templates of a plurality of known good, manufactured parts. Each of the templates includes a part profile and a set of features. Each of the features includes a range of acceptable values. Each of the templates has a part identification code associated therewith. A first subsystem optically measures a profile and features of a part to be purchased. The system further includes a processor operable to compare the profile and the features of the part to be purchased with the profile and corresponding features of each of the stored templates to identify a template which most closely matches the profile and features of the part to be purchased and to generate and transmit an identification signal representing the part identification code for the part associated with the most closely matched template.

Other U.S. patents related to at least one embodiment of the present invention include: U.S. Pat. Nos. 7,403,872; 7,777,900; 8,237,935; 7,633,046; 7,633,634; 7,738,121; 8,132,802; 8,550,444; 7,755,754; 8,013,990; 7,738,088; 7,907,267; 7,796,278; 7,684,054; 7,920,278; 7,812,970; 8,004,694; 8,416,403; 8,570,504; 9,047,657; 9,019,489; 9,575,013; 9,697,596; 8,390,826; 8,896,844; 9,486,840;

8,993,914; 9,372,077; 9,377,297; 9,228,957; 9,539,619; 9,370,799; 9,372,160; 8,977,035; 10,209,200; and 10,207,297.

U.S. Pat. No. 10,207,297 discloses a method and system for inspecting a manufactured part supported on an optically-transparent window of a rotary actuator at an inspection station. The window rotatably supports the part in a generally vertical orientation at which a bottom end surface of the part has a position and orientation for optical inspection. An illuminator is configured to illuminate the bottom end surface of the part through the window with radiant energy to obtain reflected radiation signals which are reflected off the bottom end surface of the part. The reflected radiation signals travel through the window. A lens and detector assembly is configured to form a bottom image from the reflected radiation signals at a bottom imaging location below the window and is configured to detect the bottom image. The window is made of a material which is substantially transparent to the radiant energy and the reflected radiation signals.

Several types of algorithms or methods for detection of part defects have been developed over the years. These algorithms and the systems utilizing same can be classified into three general categories: Reference system pattern matching; non-reference or generic property verification; and measurement or gauging.

Reference systems compare pixel values or properties of a known good parts with those under test. The matching may be done by direct comparison of intensity values, by comparison of statistical or spatial features, or by matching nodes and end points in a graph which defines the topology of the part. Mismatches between the reference patterns and the image under test are used to detect flaws. One advantage of the reference approach is that much of the knowledge required to determine if a part is good is contained within the reference pattern. One of the problems with this approach is the difficulty in accurately registering or aligning the two images for comparison, thereby resulting in an ambiguity range between a good and a defective part. Another problem with the reference approach is that the data representation of the reference image must be sufficiently compact to avoid excessive memory costs and slow data transfer rates. In general, the reference method is good in finding gross defects but has more trouble in detecting flaws small in size relative to the entire image because of the misregistration problem.

Non-reference systems differs from reference systems in that no comparison between the image to be inspected and a reference image is needed. This approach does not average the various features in an image into a single statistic or set of statistics but instead analyzes each of the features individually. Thus, an important advantage of this approach is that no information is lost. Such a system searches an image for the presence of a specific set of features. Flaws are detected by the presence or absence of these features. In order for such a system to be successfully implemented, the set of guidelines used to detect or describe any given feature must be unambiguously defined and must be applicable throughout the entire image being inspected.

The non-reference method is most effective in applications where a set of rules applies to each point in the part. If this method is to be exclusively used, then the inspection criteria must be described by a compact, context-independent set of specifications. Unfortunately, design rules are routinely violated throughout the part manufacturing industry without affecting the functionality of a part design. With respect to certain designs, the presence of multiple layers can cause the appearance of violations when in fact no error has occurred. The impact on the non-reference method is that the list of inspection rules can potentially become very long, resulting in a time-consuming algorithm. In summation, the non-reference method is not general enough to be applicable under a wide variety of conditions and often becomes "crippled" when rule violations occur.

Measurement or gauging systems are often designed to report dimensions of patterns and provide feedback (S, Y and theta measurements for alignment) for process control. These systems assume that the measurement area is defect free and that a good estimate, at least in a least squares sense, is available to locate the position of each pattern precisely. Most commercially available part inspection systems do not provide full-function part inspection and dimensional measurement. For hybrid inspection systems alignment is very important and in integrated part inspection systems precise line width measurements are required. Measurement accuracy at any single location is also affected by digitization. Confidence in the measurement is typically plus or minus the size of each pixel or picture element.

Many of the above-noted methods and systems use templates of known, good parts during the inspection process. Templates for threaded fasteners typically include a thread model. A thread model is an estimate for one cycle of the repeated thread form and is typically learned at template edit time.

As described in U.S. Pat. No. 7,796,278 (i.e. '278 patent), A thread model is a learned sequence of points that represent a best estimate of the outline of one cycle of the thread form. The thread model is calculated when the inspection region is specified, at template edit time.

The measure template routine uses a pattern match algorithm with a sine wave pattern to identify periodicity in the inspection region data. This process determines an approximate thread pitch. The process also calculates a starting point in the data vector for the first beginning of the matched pattern, which is an approximation to the first midpoint of a right flank line.

With the pitch and the starting point in hand, the measure template routine can then calculate an average thread model. Starting with the first sample point in the matched pattern, points that are 1, 2, 3, . . . , N pitches later in the inspection region are averaged to form the first point of the thread model. The process is repeated for all the rest of the points in the first matched pattern. The thread model is then stored in the template for later use.

The thread model described in the '278 patent is a sampled representation of one sensor's thread profile, for exactly one pitch. The thread model starts at the midpoint of a rising thread flank and ends one pitch later.

Using a correlation detector the thread model is matched to data within the inspection regions, producing thresholded detections within the inspection region, that are called crossings. FIG. 17 of the '278 patent shows a sketch of a thread model matched to the sensor data.

The '278 patent also discloses a 3-Point Wire Pitch Diameter method. The 3-point pitch diameter computes 3-point distances using the wire positions computed in the sensor data. The 3-point wire pitch diameter is the median of the 3-point wire pitch diameter. FIG. 20 of the '278 patent is a schematic view that illustrates a 3-point distance method, applied to thread wire positions. Shown are two wire positions in the top thread form with a reference line drawn between them. Also, shown is a single wire position on the bottom thread form with the 3-point distance indicated.

As described in the '278 patent, the building or construction of templates for optical part inspection is tedious, time consuming and prone to human error. Consequently, it would be desirable if such templates could be generated automatically without little or no user input.

SUMMARY OF EXAMPLE EMBODIMENTS

An object of at least one embodiment of the present invention is to provide a high-speed method and system for inspecting unidentified mixed parts to identify the parts rapidly and reliably. In this way, the method and system can help recertify previously uncertified parts such as fasteners so the recertified fasteners can be reintroduced into inventory thereby reducing waste.

In carrying out the above object and other objects of at least one embodiment of the present invention, a method of inspecting unidentified mixed parts at an inspection station having a measurement axis is provided. The method includes storing templates of a plurality of known good parts. Each of the templates include a part profile and a set of features. Each of the features includes a range of acceptable values. Each of the templates has a part identification code associated therewith. At the inspection station, the method further includes providing a vision-based robotic system including a robot to pick-up a self-supporting part to be identified and place the part on a fixtureless rotary stage so that a part axis of the part is substantially centered and aligned with the measurement axis of the inspection station. The method further includes optically measuring a profile and features of the rotating part and comparing the profile and the features of the part to be identified with the profile and corresponding features of the stored templates to identify a part which matches the profile and features of the part to be identified. Still further, the method includes generating and transmitting an identification signal representing the part identification code for the part associated with a matched template.

Unidentified parts and parts having an unacceptable geometric dimension or defect may be directed to a reject part area and identified parts having acceptable geometric dimensions and no significant defects may be directed to good part areas based on the identification signals. In this way, the parts are sorted.

The step of optically measuring may include the steps of projecting a beam of radiation at the self-supporting part and rotating the rotary stage and the part to be identified about the measurement axis so that the rotating part stays upright to partially obstruct the beam to obtain at least one unobstructed portion of the beam of radiation. The method may also include imaging the at least one unobstructed portion of the beam of radiation to obtain a first set of electrical signals.

The method may further include processing the first set of electrical signals to obtain the profile and features of the part to be identified.

The part to be identified may be at least partially conductive or semiconductive, wherein a feature of at least one of the templates includes an eddy current signature. The method may further include the steps of inducing an eddy current in the rotating part, sensing the induced eddy current and comparing the eddy current signature with the sensed eddy current.

The part to be identified may partially obstruct the beam of radiation to obtain first and second unobstructed portions. The first and second unobstructed portions of the beam of radiation may be imaged to obtain the first set of electrical signals.

Each of the first and second unobstructed portions of the beam of radiation may contain a magnitude of radiation which is representative of a respective geometric dimension of the part to be identified.

The part to be identified may have threads. A last one of the templates may include at least one feature related to threads.

The part may be an externally threaded fastener.

Each part axis may be defined as being central to its part and parallel to its length.

Further in carrying out the above object and other objects of at least one embodiment of the present invention, a system for inspecting unidentified mixed parts at an inspection station having a measurement axis is provided. The system includes an electronic storage device to store templates of a plurality of known good parts. Each of the templates includes a part profile and a set of features. Each of the features includes a range of acceptable values. Each of the templates has a part identification code associated therewith. At the inspection station, there is included a vision-based robotic subsystem including a robot configured to pick up and place a self-supporting part on a fixtureless rotary stage so that a part axis of the part is substantially centered and aligned with the measurement axis. A second subsystem optically measures a profile and features of the part during part rotation. A processor is operable to compare the profile and the features of the part to be identified with the profile and corresponding features of the stored templates to identify a template which matches the profile and features of the part to be identified and to generate and transmit an identification signal representing the part identification code for the part associated with the matched template.

A mechanism including a part sorter may direct unidentified parts and parts having an unacceptable geometric dimension or defect to a reject part area and may direct identified parts having acceptable geometrical dimensions and no significant defects to good part areas based on the identification signals.

A system controller may be coupled to the processor and the part sorter to control the sorting based on the inspecting.

The second subsystem may include a projector to project a beam of radiation and a rotary actuator assembly to rotate the stage and the self-supporting part about the measurement axis so that the rotating part stays upright to partially obstruct the beam to obtain at least one unobstructed portion of the beam of radiation. The second subsystem may also include an imager to image the at least one unobstructed portion of the beam of radiation to obtain a first set of electrical signals.

The processor may be further operable to process the first set of electrical signals to obtain the profile and features of the part to be identified.

The part to be identified may be at least partially conductive or semiconductive. A feature of at least one of the templates may include an eddy current signature. The system may further include an eddy current sensor to induce an eddy current in the rotating part and to sense the induced eddy current. The processor may also compare the eddy current signature with the sensed eddy current.

The part to be identified may partially obstruct the beam of radiation to obtain first and second unobstructed portions. The first and second unobstructed portions of the beam of radiation may be imaged to obtain the first set of electrical signals.

Each of the first and second unobstructed portions of the beam of radiation may contain a magnitude of radiation which is representative of a respective geometric dimension of the part to be identified.

The part to be identified may have threads.

At least one of the templates may include at least one feature related to the threads.

The part may be an externally threaded fastener.

Each part axis may be defined as being central to its part and parallel to its length.

Other technical advantages will be readily apparent to one skilled in the art from the following figures, descriptions and claims. Moreover, while specific advantages have been enumerated, various embodiments may include all, some or none of the enumerated advantages.

BRIEF DESCRIPTION OF THE DRAWINGS

FIG. 17 is a top perspective view, partially broken away, illustrating the part inspection conveyors and a bagger conveyor and bagging machine of the bagging subsystem;

FIGS. 18a and 18b are side schematic block diagram views, partially broken away, of various components and subsystems of a system constructed in accordance with at least one embodiment of the present invention including optical inspection devices and an actuator assembly;

FIG. 21 is a view, partially broken away, of a database populated with data after uploading from the spreadsheet of FIG. 20;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 2:
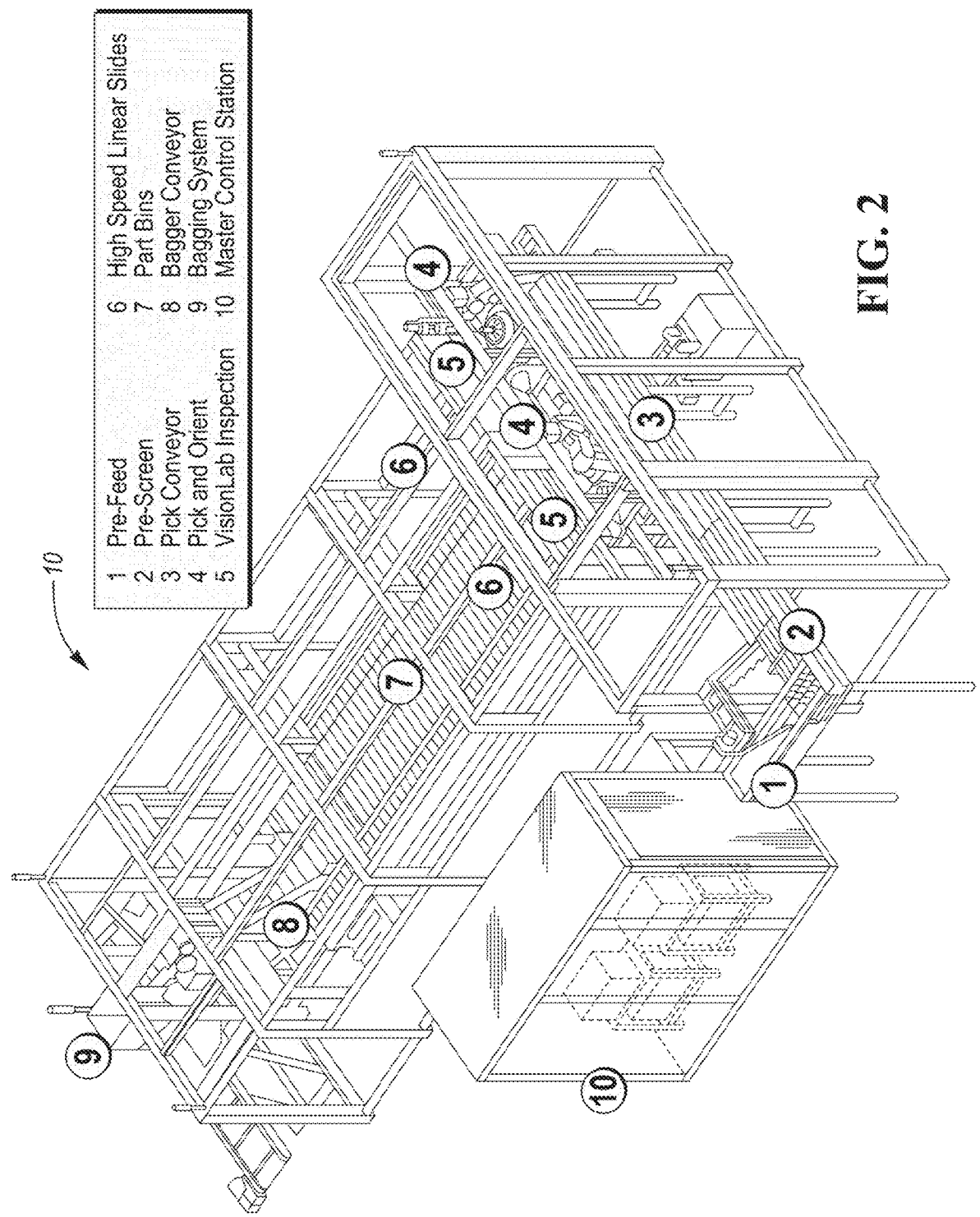
FIG. 2 is a top perspective schematic view of a system constructed in accordance with at least one embodiment of the present invention and showing various components and subsystems of the system as noted by numbers in a legend.

Referring now to FIG. 2, there is illustrated an overview or system level diagram which shows the various components and subsystems of at least one embodiment of a system, generally indicated at 10, constructed in accordance with the present invention. Numbers 1 through 10 are indicated in a legend and are encircled on or near the various identified components and subsystems to facilitate understanding of the system and its corresponding method. The system 10 may be referred to as ARIS (Automatic Reclamation and Inspection System): a self-contained machine designed to automatically perform complete dimensional and visual inspection of mixed parts such as aerospace fasteners 36 to recertify, reclassify, package and place them into inventory for future use.

Some of the many benefits of the use of the system 10 and its corresponding method include but are not limited to: eliminate or reduce waste; time savings; improve quality; and positive impact on the bottom line.

In other words, the system 10 or machine is a technical system which can be used to recertify aerospace fasteners 36 as well as self-supporting parts. Bolts, nuts, and collars are introduced into the system for the purpose of part identification and certifying parts which fall into one of two classes. The first class is new and unused parts. These parts are capable of being re-introduced into inventory. The second class is parts that are not fit to be used and must be removed. The system 10 includes many devices and subsystems working together to create seamless, consistent, automated and accurate results.

Figure 3:
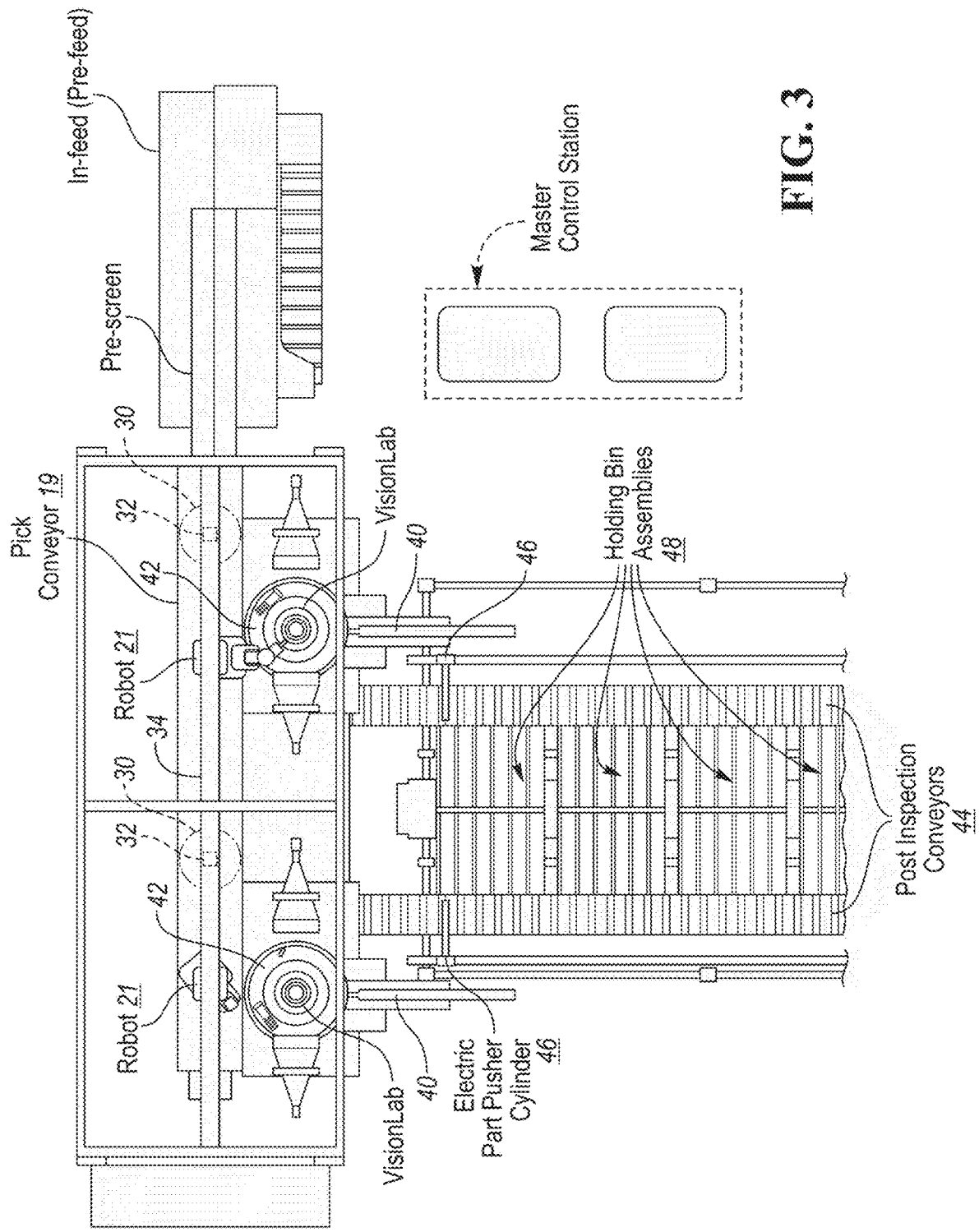
FIG. 3 is top plan view, partially broken away, of various components and subsystems of the system of FIG. 2.

Referring now to FIGS. 2 and 3, initially at an infeed or pre-feed stage (labeled "1" in FIG. 2), an operator dumps mixed fasteners 36 or parts into a large, low profile vibratory hopper. Parts vibrate onto a pre-screen subsystem (i.e. "2" in FIG. 2) that separates parts by general size. This eliminates the opportunity for larger parts to 'hide' smaller parts as will be evident hereinbelow.

Parts are then fed through a gentle-handling, vibratory carpet feeding subsystem thereby transporting parts into multiple lanes. The pre-screen subsystem is a multi-lane vibratory v-shaped transport system that moves parts into single files, gently transitioning them onto a pick conveyor 19 (i.e. "3" in FIG. 2) making a subsequent pick process by a robot 21 more accurate and efficient.

The pick conveyor 19 is a multi-lane conveyor controlled by the master controller (FIG. 18*a*) via a conveyor controller 33 (FIG. 18*b*) which transports and positions parts to two vision-guided robots 21 (i.e. "4" in FIG. 2) after traveling through the fields of view 30 of a pair of cameras 32. The cameras 32 and the robots 21 are mounted on support beams of a support frame structure 34 of the system 10. A rough textured belt of the pick conveyor 19 minimizes part movement during transport.

The vision-guided robots 21 have the ability to pick up any part within a specified range of allowable parts using multiple end-of-arm tooling or grippers 17. The robots 21 pick up the bolts, nuts and collars and orient them at two inspection stations, each of which is referred to as a VisionLab. Each of the parts has a part axis and each of the inspection stations has a measurement axis 13 (i.e. FIG. 18*a*). Each robot 21 precisely positions self-supporting fasteners 36 on a fixtureless, rotary support or stage, generally indicated at 14, at its inspection station so that the part and measurement axes are substantially centered and aligned.

The robots 21 are preferably six axis robots located adjacent the pick conveyor 19 and at the VisionLab inspection stations. Each robot 21 is vision-guided to identify, pick, orient, and present the parts 36 "head down" so that they are self-supporting on the VisionLab glass stage 14. The grippers 17 accommodate multiple part families.

Benefits of Vision-based Robot Automation include but are not limited to the following:
Smooth motion in high speed applications;
Handles multiple parts 36;
Slim designs to operate in narrow spaces;
Integrated vision; and
Dual end-of-arm tooling or grippers 17 designed to handle multiple part families.

Figure 5:
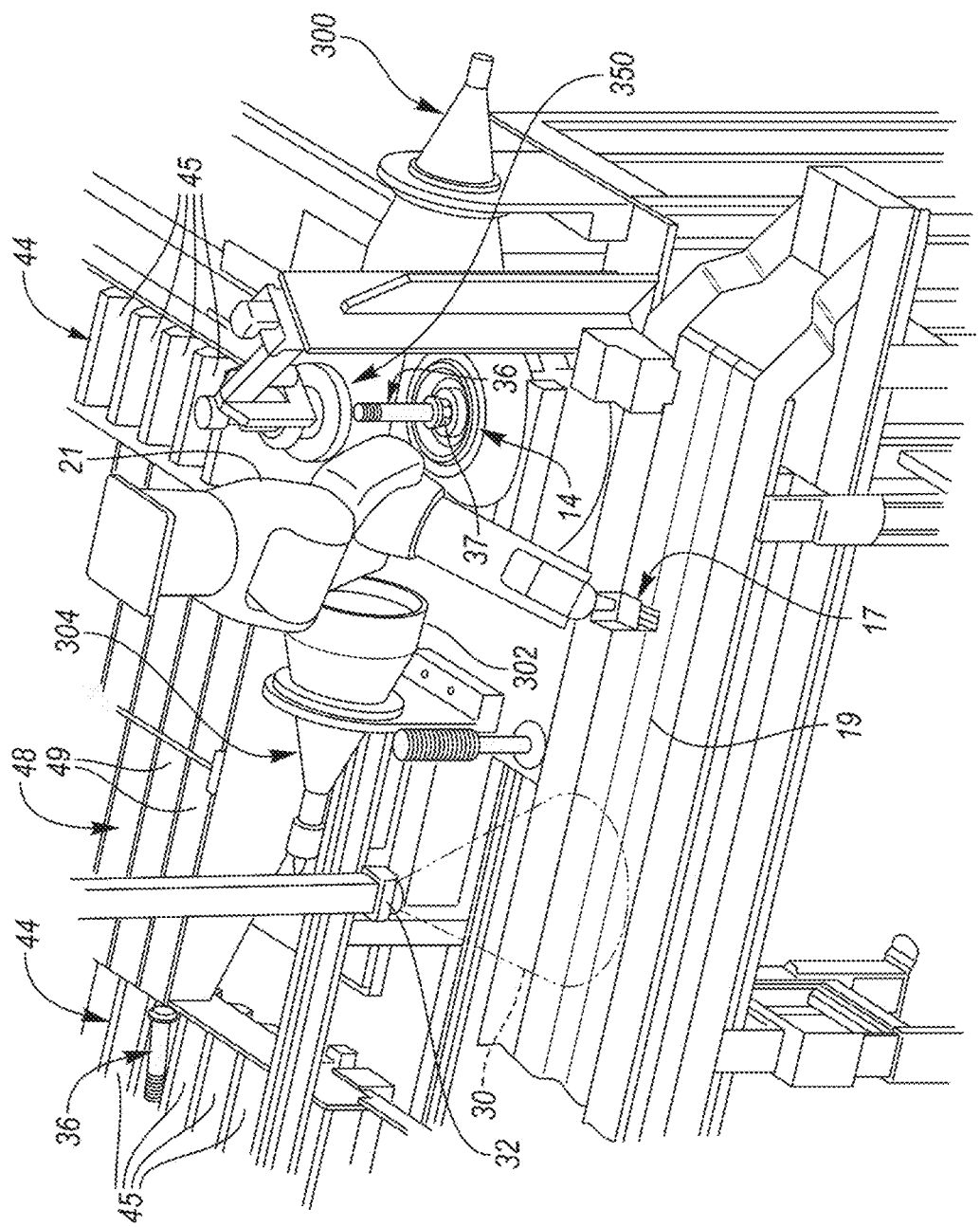
FIG. 5 is a top perspective schematic enlarged view, partially broken away, of one of the vision-based robotic subsystems and a return conveyor of the system.
Figure 6:
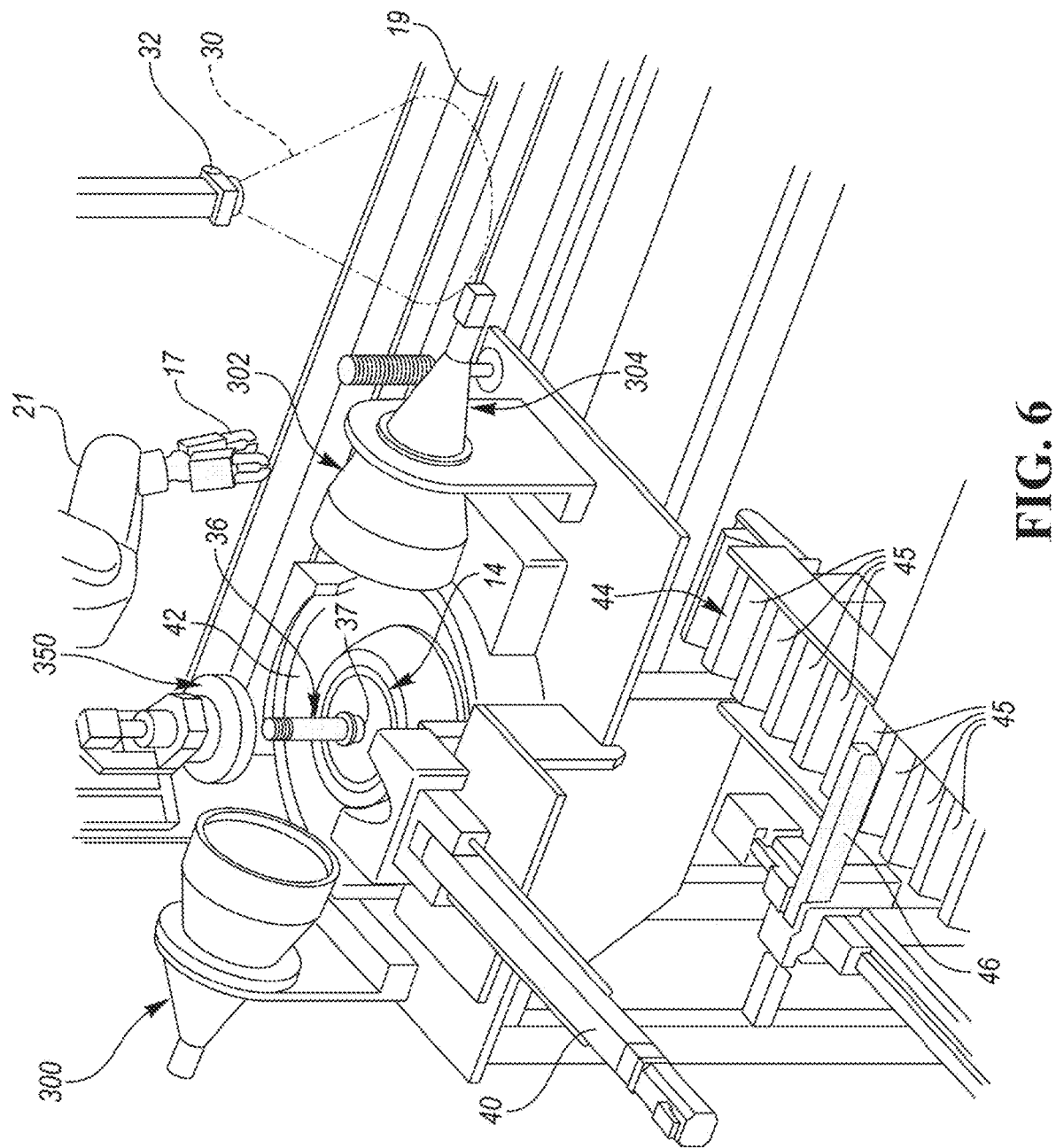
FIG. 6 is a view similar to the view of FIG. 5 but from a different angle to particularly illustrate how a part exits from the inspection station and is received by a part inspection conveyor of the system.
Figure 7:
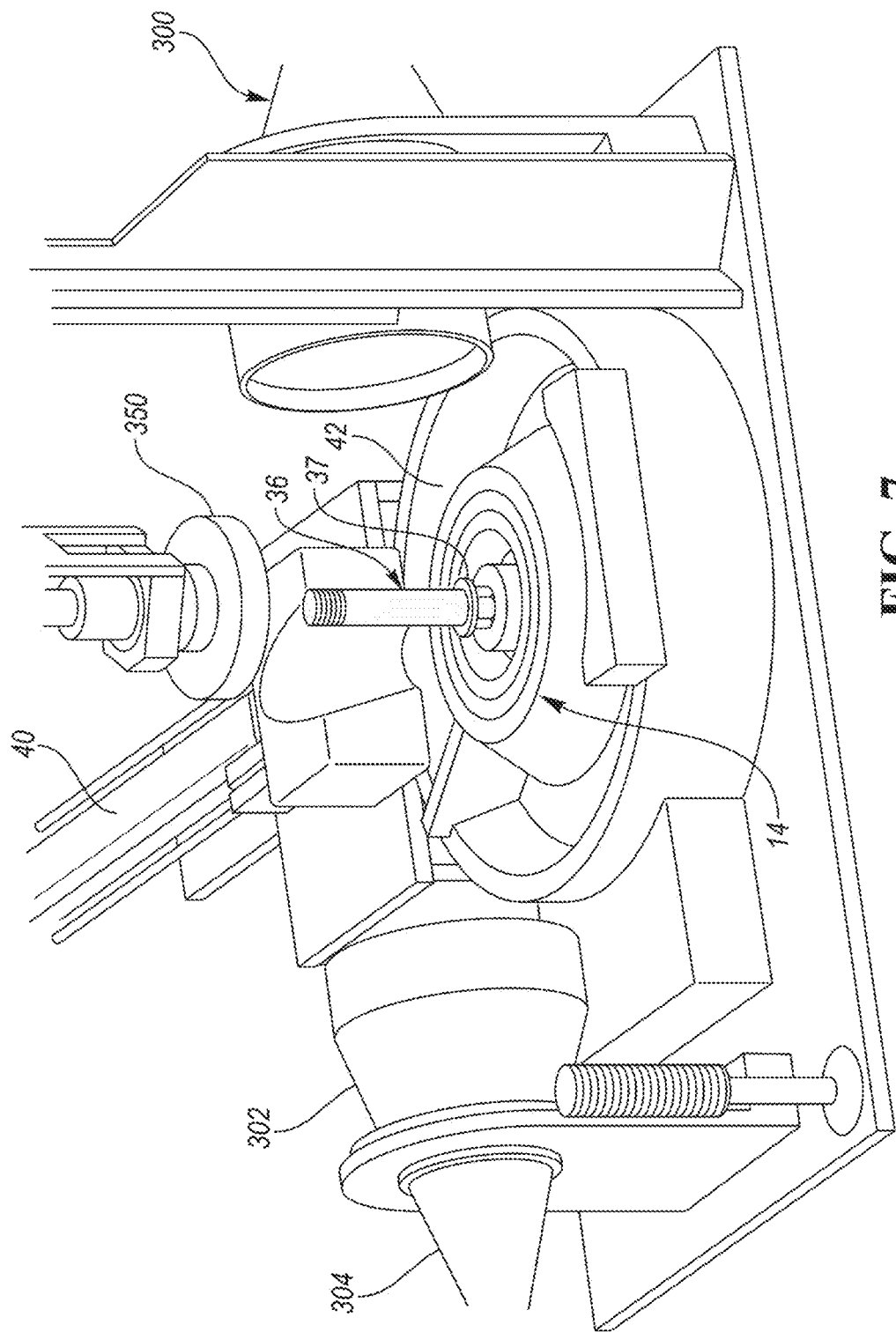
FIG. 7 is an enlarged top perspective view, partially broken away, of one of the inspection stations with a threaded bolt under inspection and particularly showing a rotary catch to route fasteners into the part exit of the station.
Figure 8:
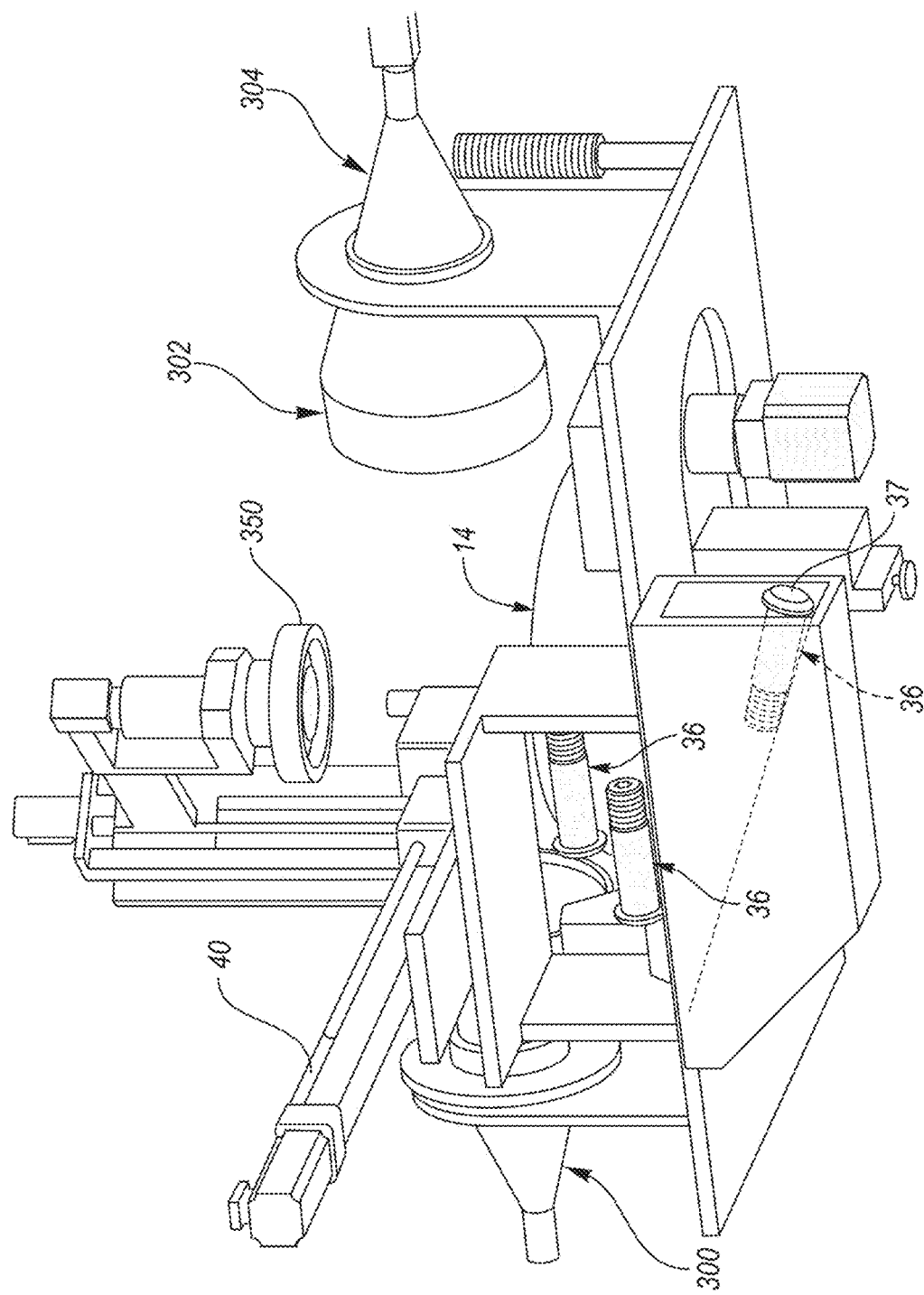
FIG. 8 is a view similar to the view of FIG. 7, but taken underneath the station and from a different angle to show previously inspected bolts exiting the station.

A master control station or system controller (FIGS. 18*a* and "10" in FIG. 2) determines locations and orientations of the fasteners 36 on the pick conveyor 19 using any suitable machine vision system having at least one camera (i.e. camera 32). Any one or more of various arrangements of vision systems may be used for providing visual information from image processors (FIG. 18*b*) to the master controller. In one example shown in FIGS. 4, 5, and 6, the vision system includes two three-dimensional stationary cameras 32 that provides light over fields of vision or view 30, creating a stripe of light (or other pattern) across the fasteners 36 as they pass under the cameras 32 on the conveyor belt of the conveyor 19. In various embodiments, the light may be a laser beam. The cameras 32, their image processors and the master controller may be configured to locate various features such as holes or heads or threads of the fasteners 36. Alternatively, or in addition, the master controller may register the contours of the fasteners based on the various depths of the light on the surfaces of the fasteners 36.

Figure 4:
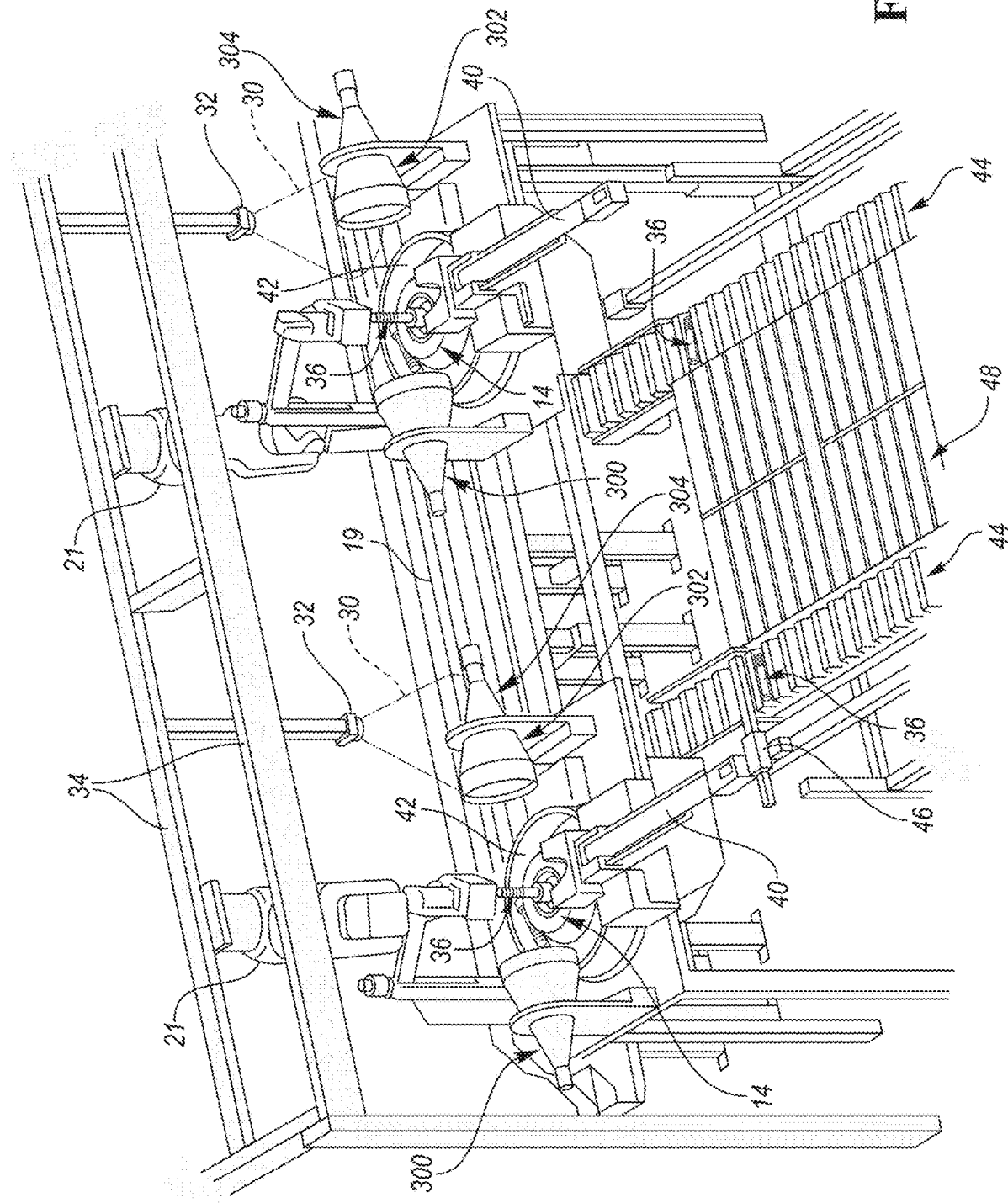
FIG. 4 is a top perspective schematic view, partially broken away, of various components and subsystems shown in FIG. 3 with particular emphasis on optical inspection stations and removal mechanisms of FIG. 3.

In some embodiments, multiple cameras such as the cameras 32 can be situated at fixed locations on the frame structure 34 at the inspection stations, or may be mounted on the arms of the robot 21. FIG. 4 shows two cameras 32 spaced apart from one another on the frame structure 34. The cameras 32 are operatively connected to the master controller via their respective image processors. The master controller also controls the robots 21 of the system 10 through their respective robot controllers 23 (FIG. 18*b*). Based on the information received from the cameras 32, the master controller then provides control signals to the robot controllers 23 that actuate robotic arm(s) of the one or more robot(s) 21 used in the method and system.

The master controller at the master control station can include a processor and a memory on which is recorded instructions or code for communicating with the robot controllers 23, the vision systems, the robotic system sensor(s), etc. The master controller is configured to execute the instructions from its memory, via its processor. For example, the master controller can be a host machine or distributed system, e.g., a computer such as a digital computer or microcomputer, acting as a control module having a processor and, as the memory, tangible, non-transitory computer-readable memory such as read-only memory (ROM) or flash memory. The master controller can also have random access memory (RAM), electrically-erasable, programmable, read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the master controller can include all software, hardware, memory, algorithms, connections, sensors, etc., necessary to monitor and control the vision subsystem, the robotic subsystem, etc. As such, a control method can be embodied as software or firmware associated with the master controller. It is to be appreciated that the master controller can also include any device capable of analyzing data from various sensors, comparing data, making the necessary decisions required to control and monitor the vision subsystem, the robotic subsystem, sensors. etc.

An end effector on the robot arm may include a series of grippers 17 supported to pick up the fasteners 36. The robotic arm is then actuated by its controller 23 to pick up the fasteners 36 with the particular gripper 17 from the conveyor 19, positioning the gripper 17 relative to the fasteners 36 using the determined location from the visual position data of the particular vision subsystem including its camera 32 and image processor (FIG. 18b).

In general, each VisionLab inspection subsystem is a inspection subsystem equipped with a rotating glass stage 14. Vision Lab inspection includes 360 degrees of coverage for dimensional and visual defect purposes. Each VisionLab subsystem identifies and inspects the given self-supporting part/fastener 36 based on criteria specific to the part.

Each VisionLab may have:

Side, top and bottom view high resolution cameras, lenses (some of which are electronically-controlled liquid lenses having a variable focal length so that fasteners of various sizes and shapes can be identified via inspection) and lighting (bottom view through VisionLab's rotating sapphire glass support or stage 14);

Color vision;

Sequenced back and front lighting for 360° dimensional and visual defect inspection;

Internal view of some fasteners 36; and

Smart motor and software combined to provide measurements and visual inspection every 1 degree of rotary motion for a total of 720 inspection points.

Referring now to FIGS. 4 through 9, Each VisionLab typically includes a high-resolution camera 304 with collimated lighting from a lighting source 300 and a custom telecentric lens 302 for complete dimensional inspection plus optional sequenced front LED lighting 350 for visual defect detection. Other options include bottom vision with the bottom lighting 200 for head markings and surface inspection, a top camera 310 with liquid lens for drive/recess inspection, an internal thread inspection camera (not shown) and liquid lens and a sensor head or color camera 400 and liquid lens for color vision.

Figure 9:
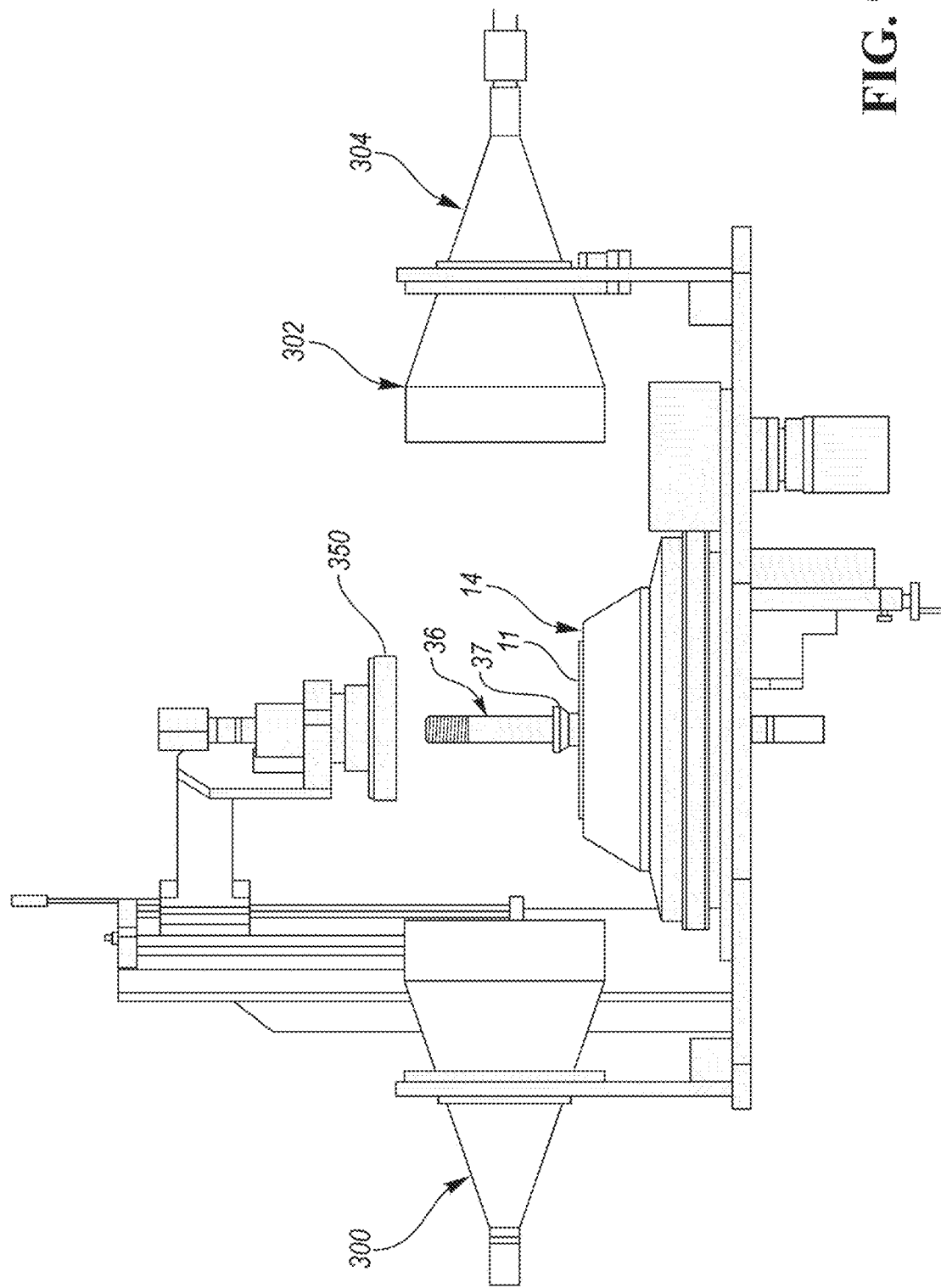
FIG. 9 is a side schematic view, partially broken away, of the inspection station of many of the previous figures and showing many of the components and subsystems of the station for complete dimensional inspection and defect detection without the need for fixtures.
Figure 10:
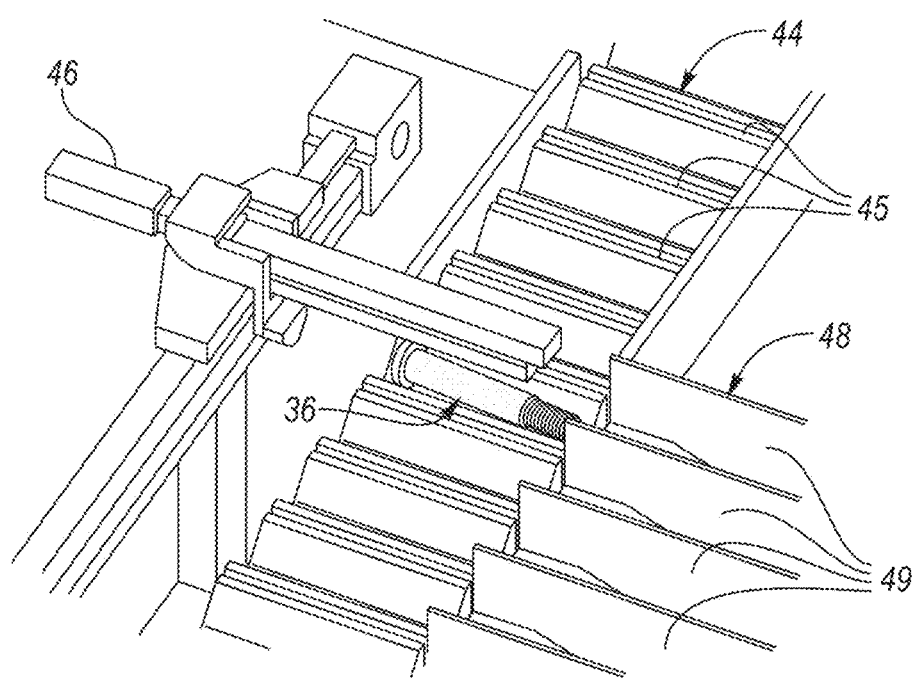
FIG. 10 is a top perspective view, partially broken away, of components of a fastener sorting subsystem wherein an identified and inspected threaded fastener is being pushed into a bin location of a bin assembly by an electric cylinder.
Figure 11:
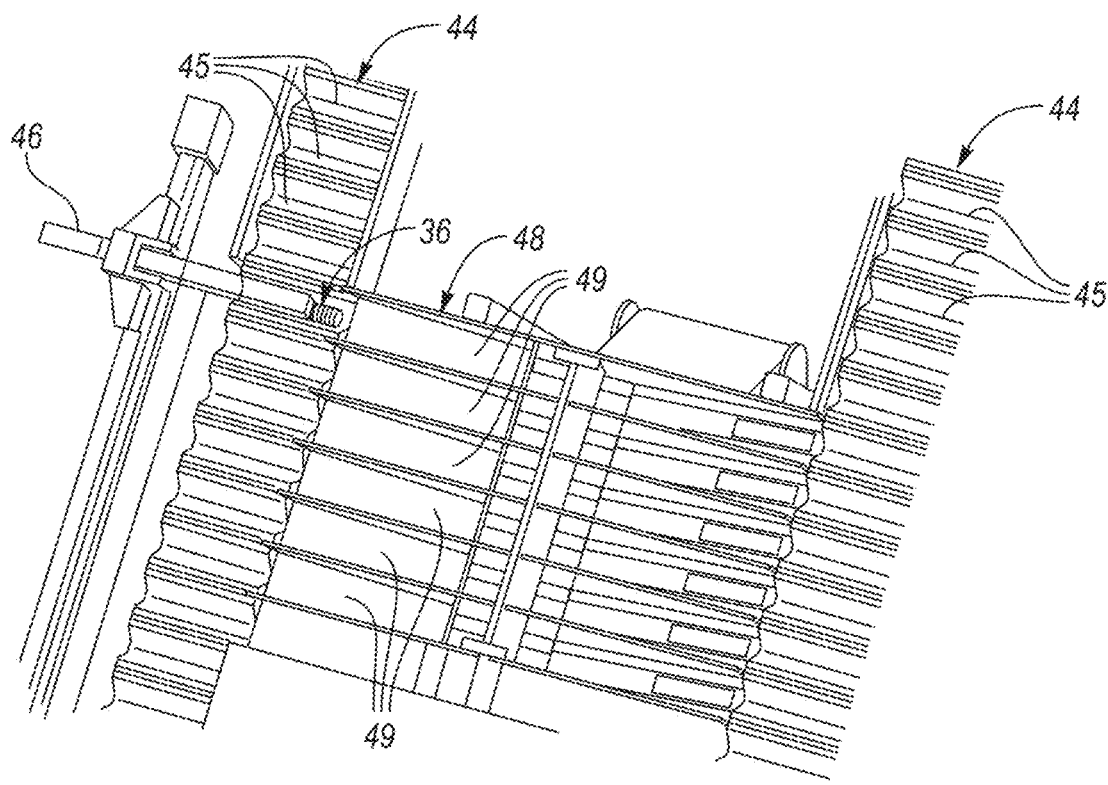
FIG. 11 is a top plan view, partially broken away, of the subsystem of FIG. 10 wherein a threaded fastener is about to slide down into the bin location.
Figure 12:
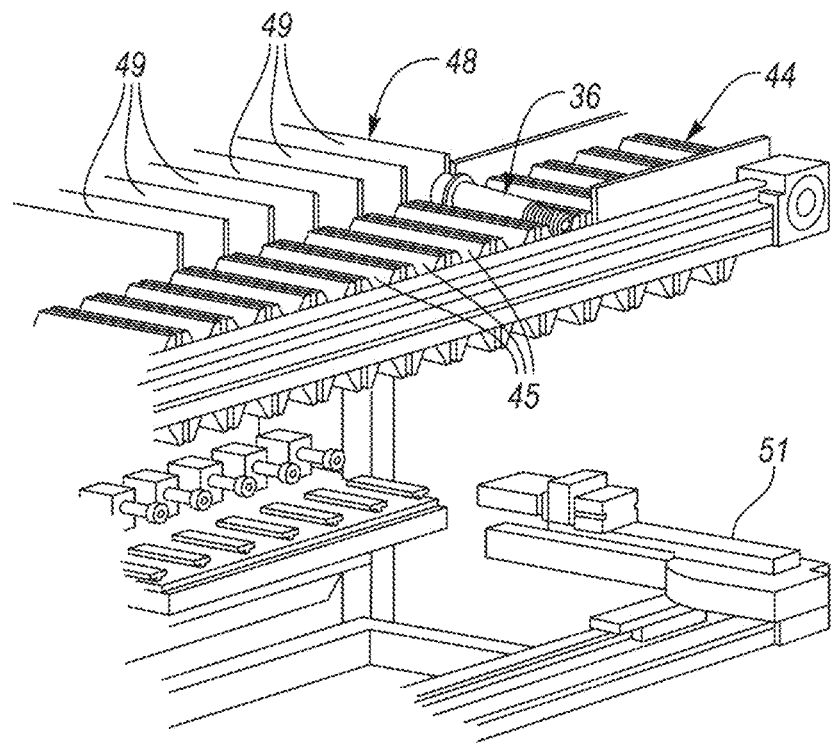
FIG. 12 is a side perspective view, partially broken away, of various components of the sorting subsystem and an electric cylinder with a gripper in its retracted position used to slide out a floor of a bin location containing fasteners in order to allow the fasteners in that location to drop from the bin location onto a conveyor of a bagging subsystem.
Figure 13:
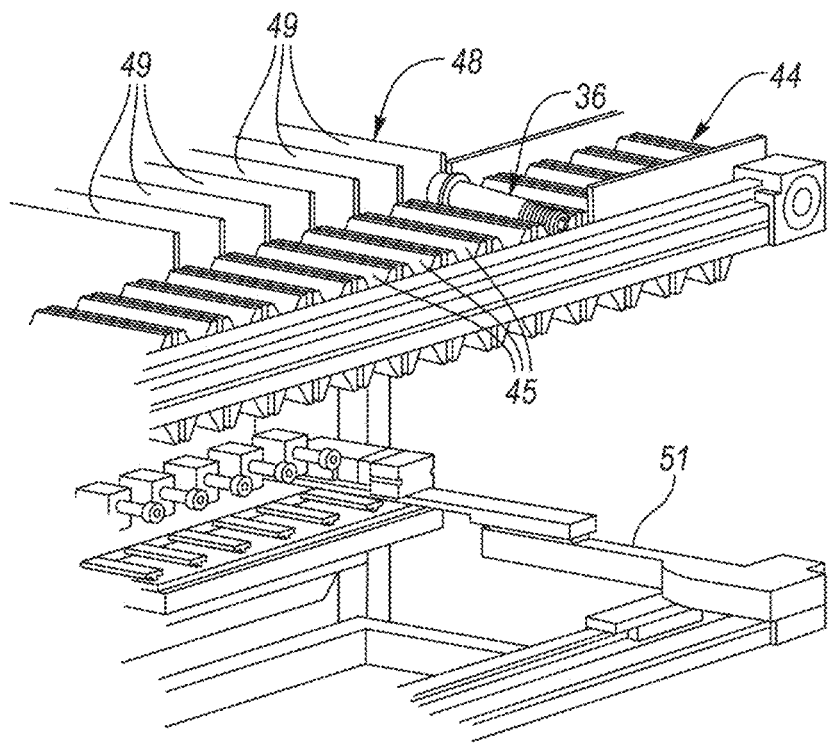
FIG. 13 is a view similar to the view of FIG. 12, but with the cylinder in its extended position in preparation to grip and slide out the floor of the bin location.
Figure 14:
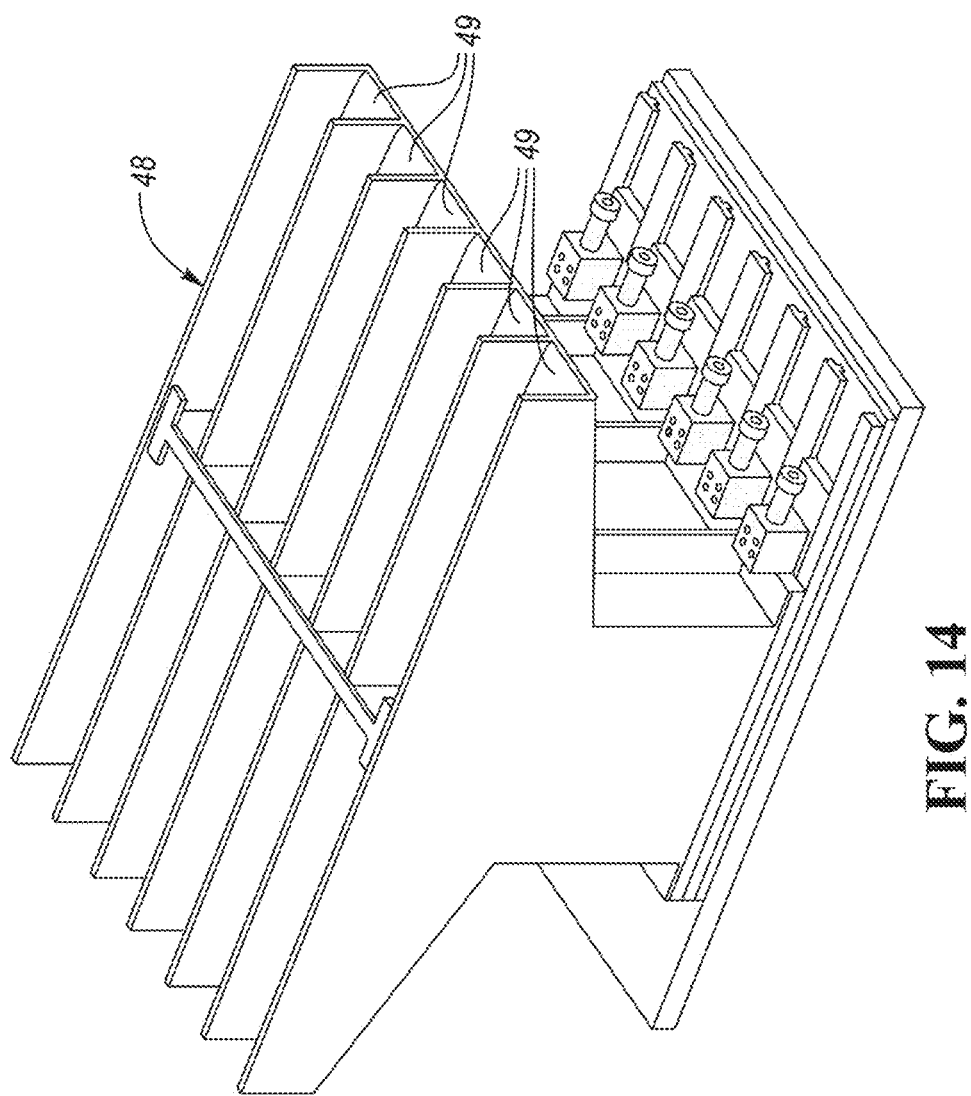
FIG. 14 is a top perspective view of one of the bin module assemblies of the sorting subsystem.
Figure 15:
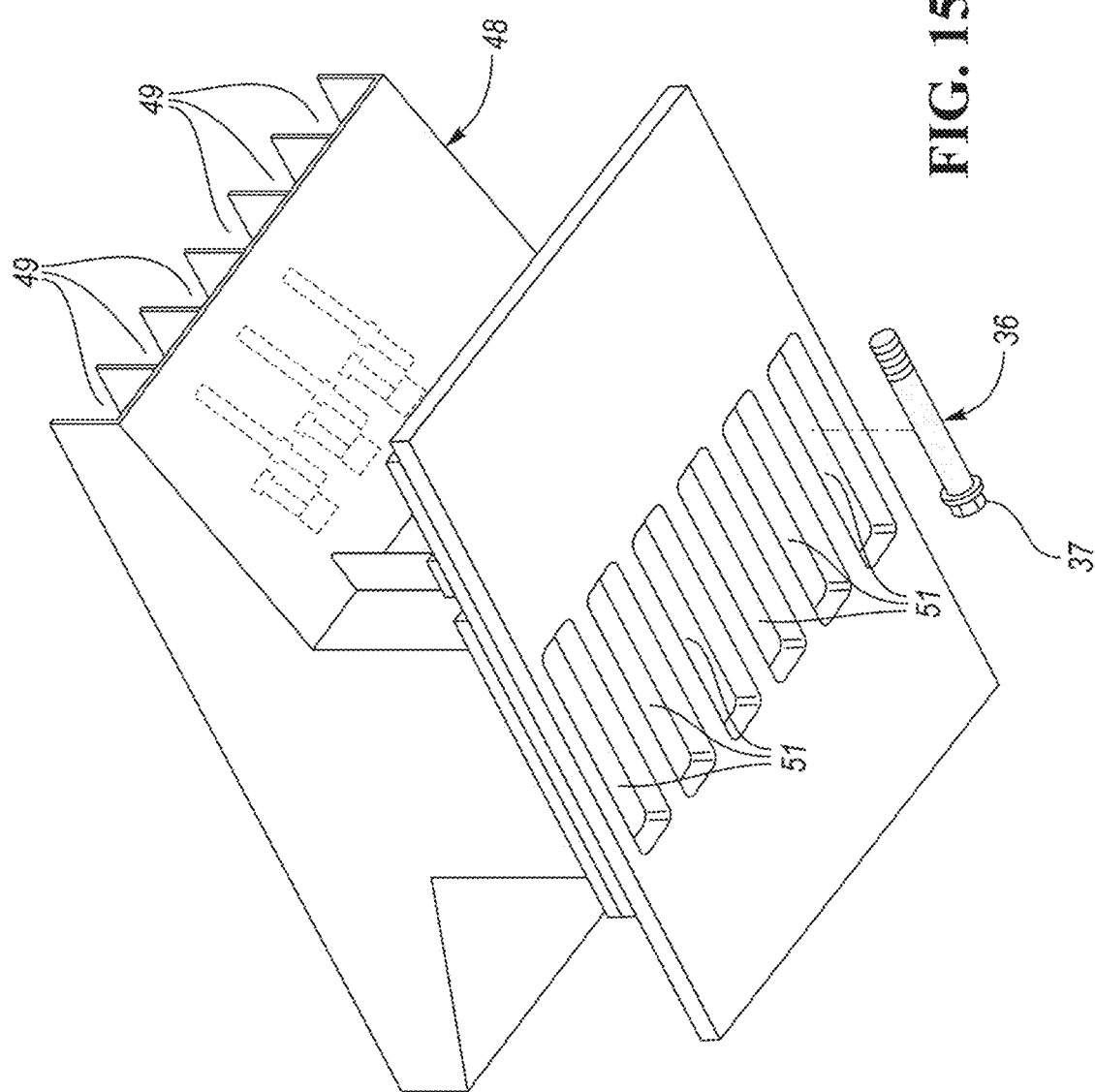
FIG. 15 is a bottom perspective view of the assembly of FIG. 14.
Figure 16:
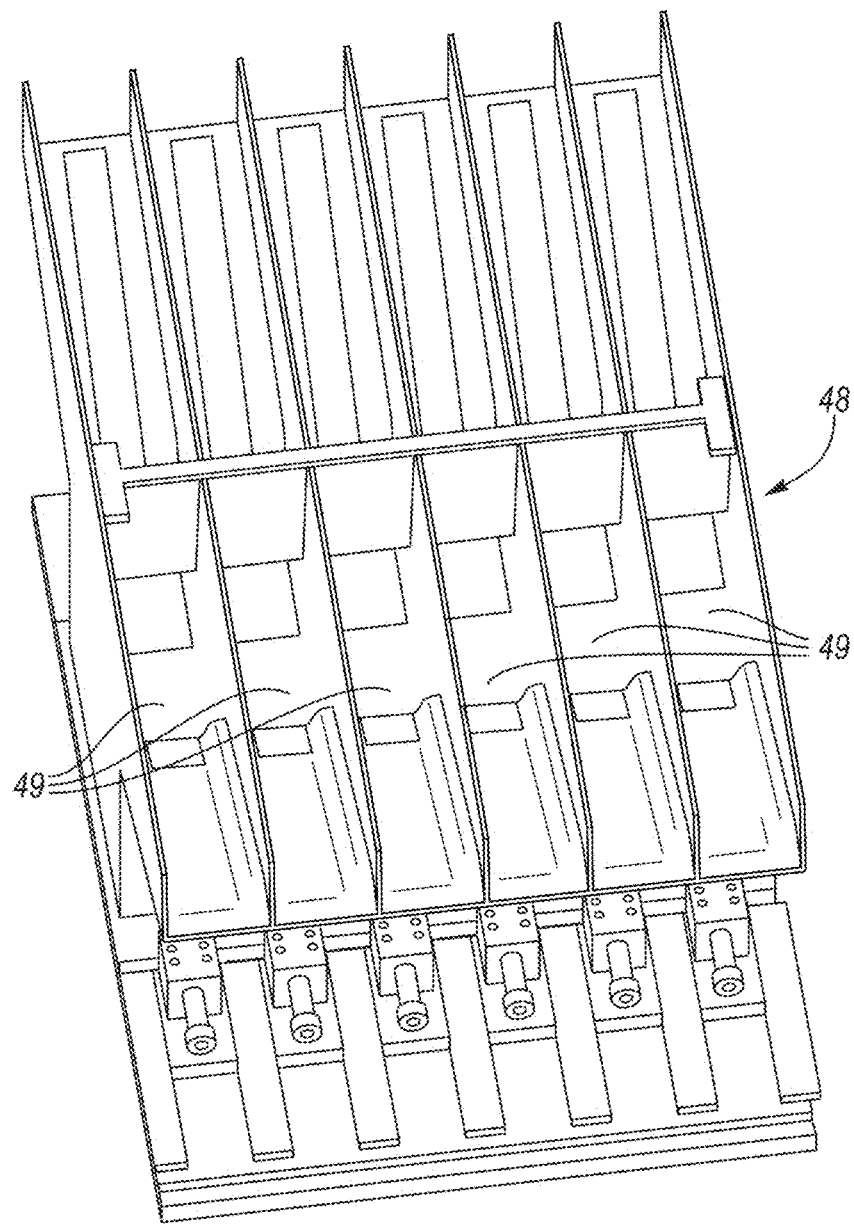
FIG. 16 is a view similar to the view of FIG. 14 from a different angle.
Figure 18A:
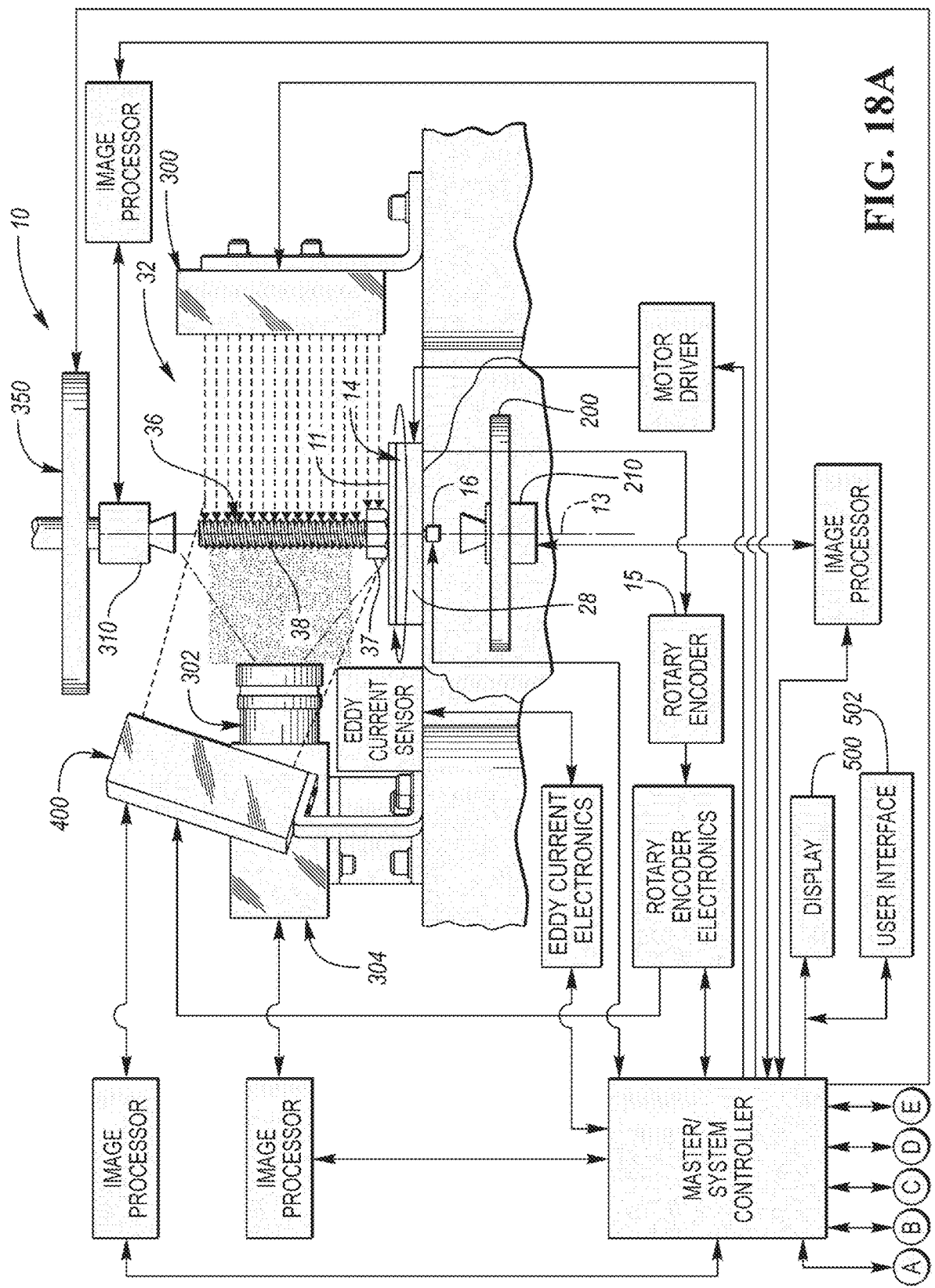
Figure 19:
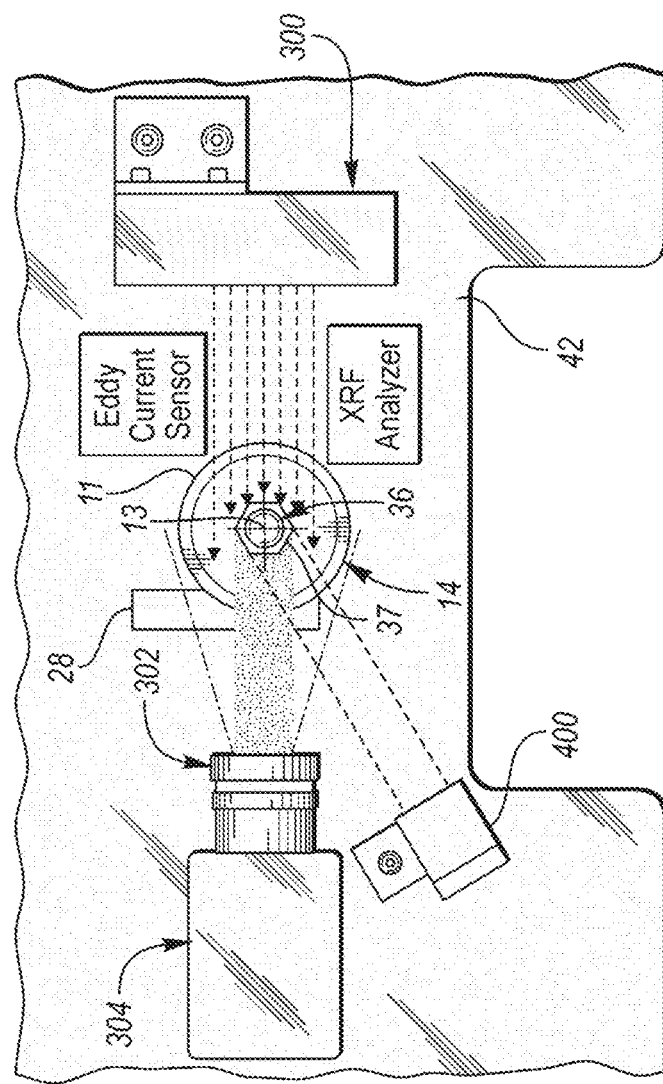
FIG. 19 is a top plan schematic view, partially broken away, of various components and subsystems of FIG. 18a including a motorized rotary subsystem, an eddy current sensor and a color camera.
Figure 20:
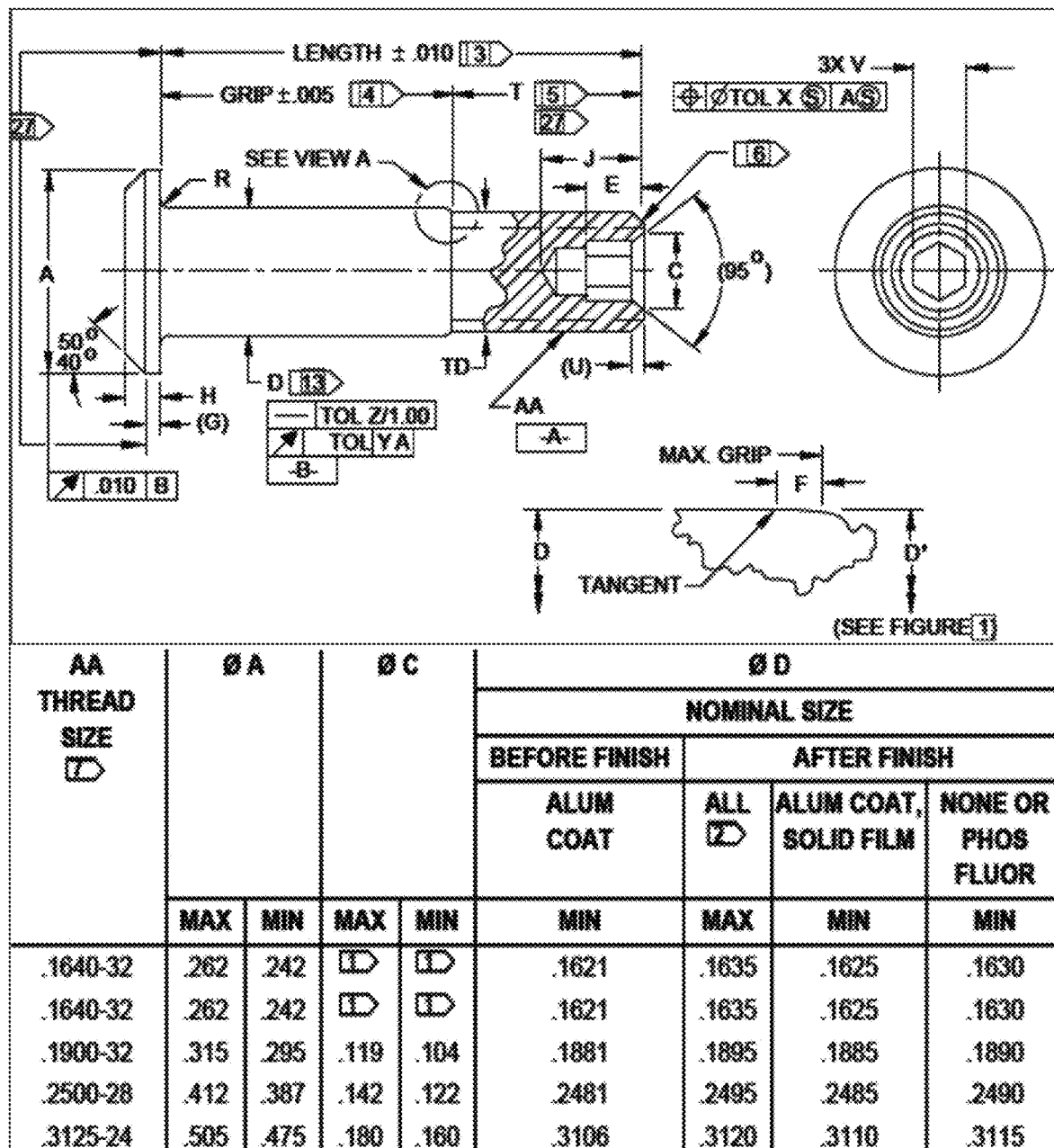
FIG. 20 is a typical customer print specification by fastener family in the form of a spreadsheet wherein various views of a typical threaded fastener are shown.
Figure 22B:
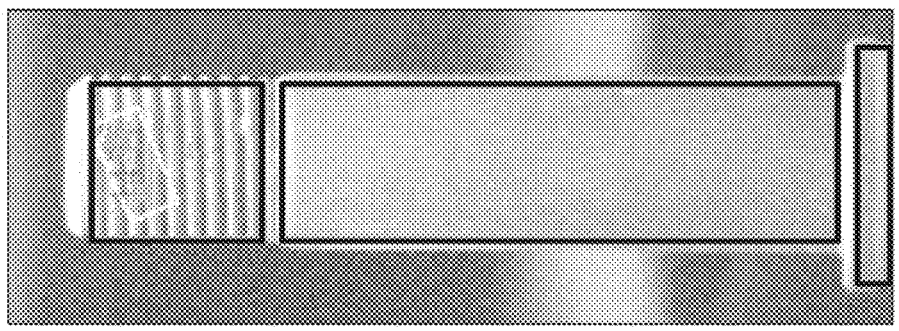
FIGS. 22a and 22b are schematic views of screen shots (with displayed icons and data) from a user interface of a master or system computer controller; the screen shot of FIG. 22a shows a bolt in profile and the screen shot of FIG. 22b shows a side schematic view of the bolt with regions of interest highlighted to search for visual defects.
Figure 22A:
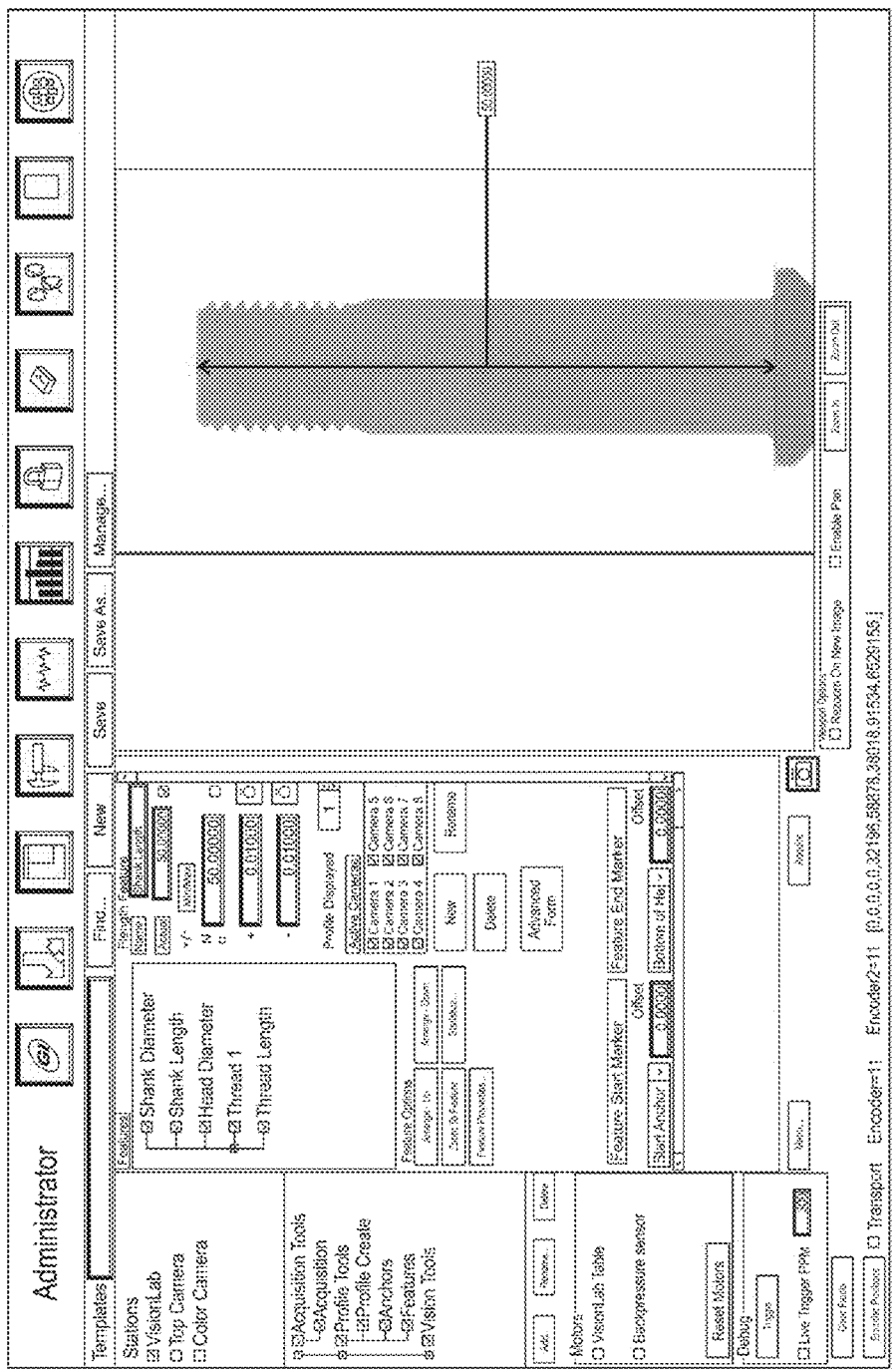
Figure 23:
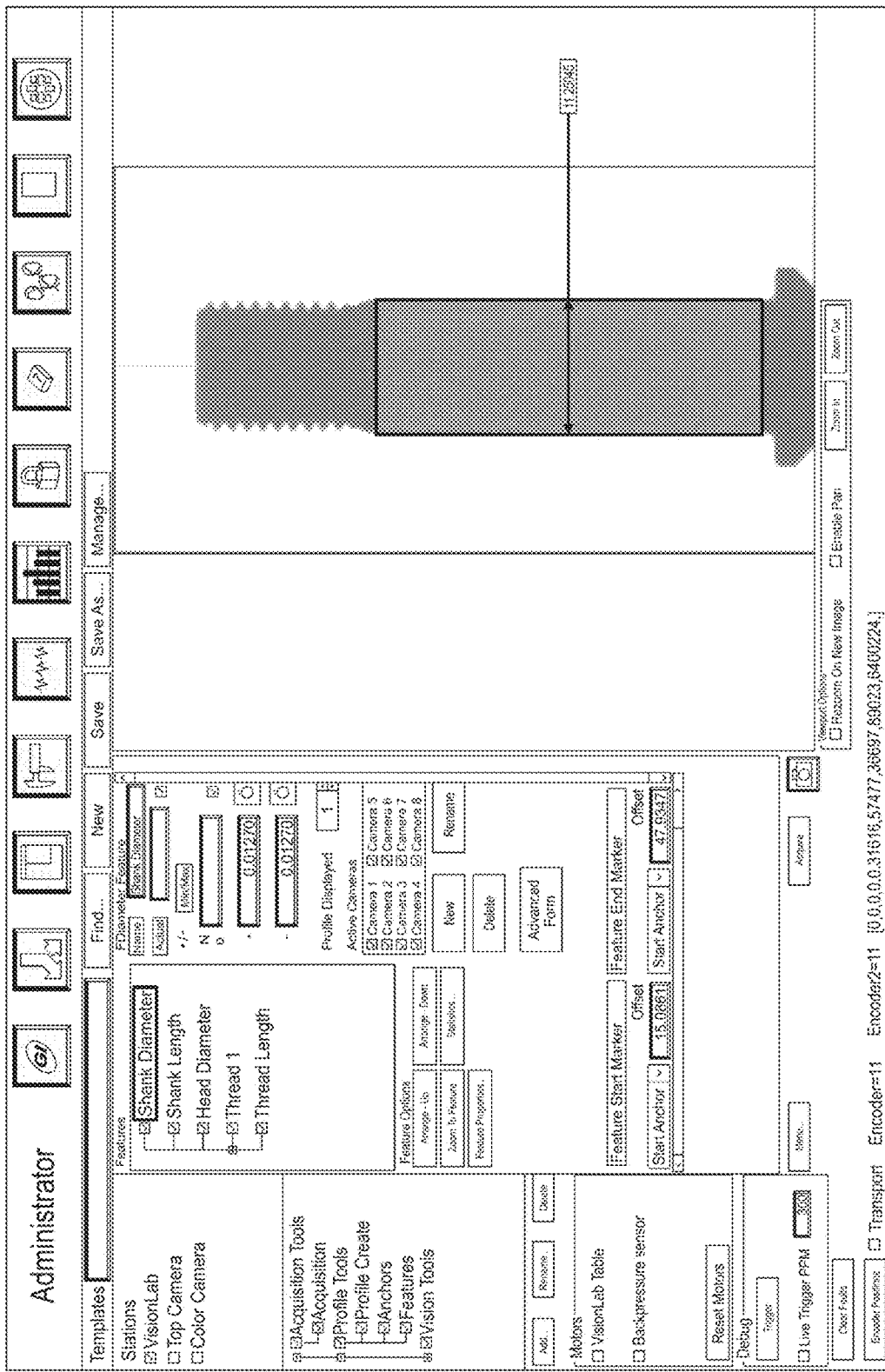
FIG. 23 is a view similar to the view of FIG. 22a showing a shank of the fastener of FIGS. 22a and 22b with particular emphasis on its diameter.
Figure 24:
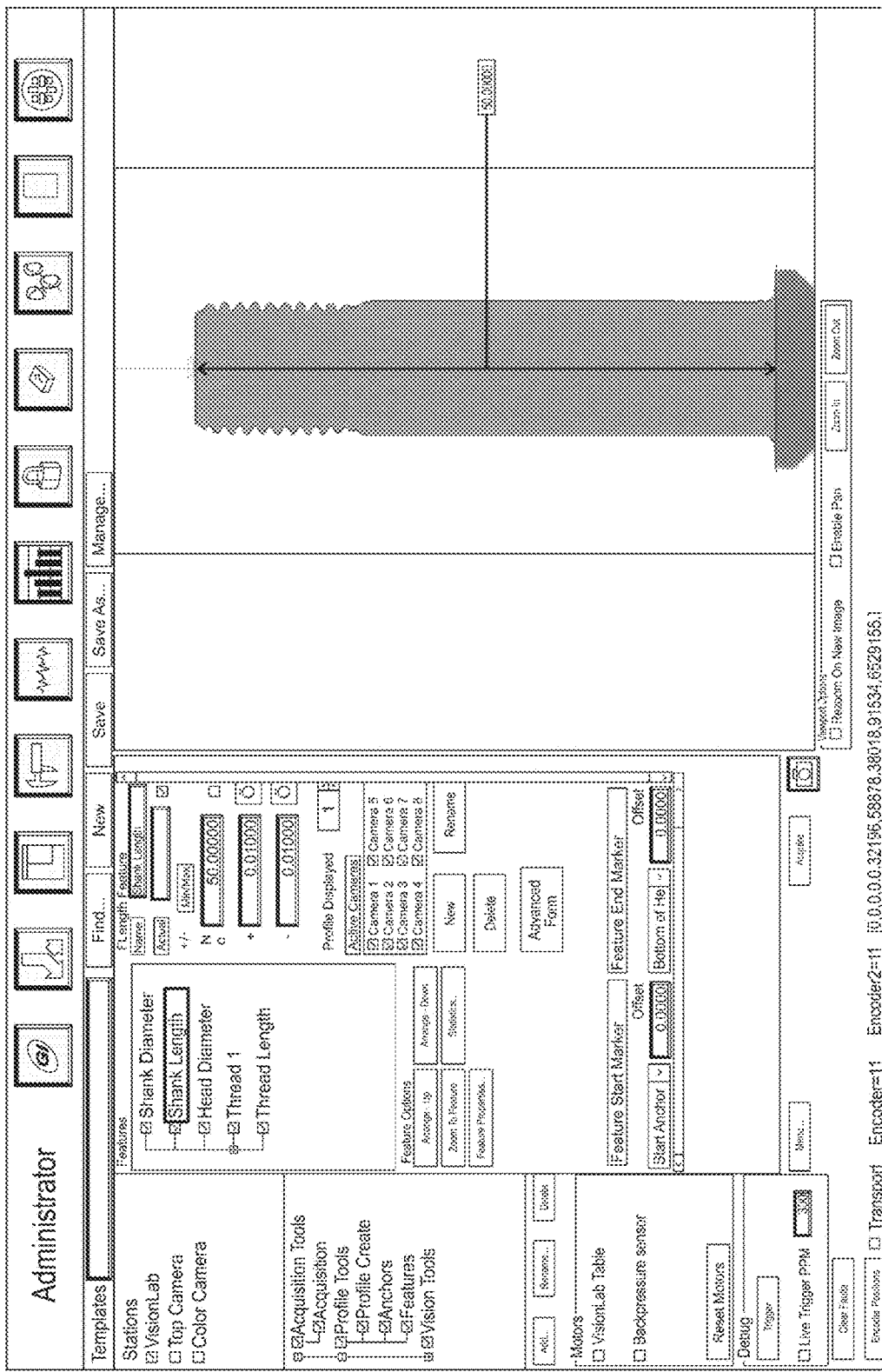
FIG. 24 is a view similar to the view of FIG. 23 with particular emphasis on the length of the shank.
Figure 25:
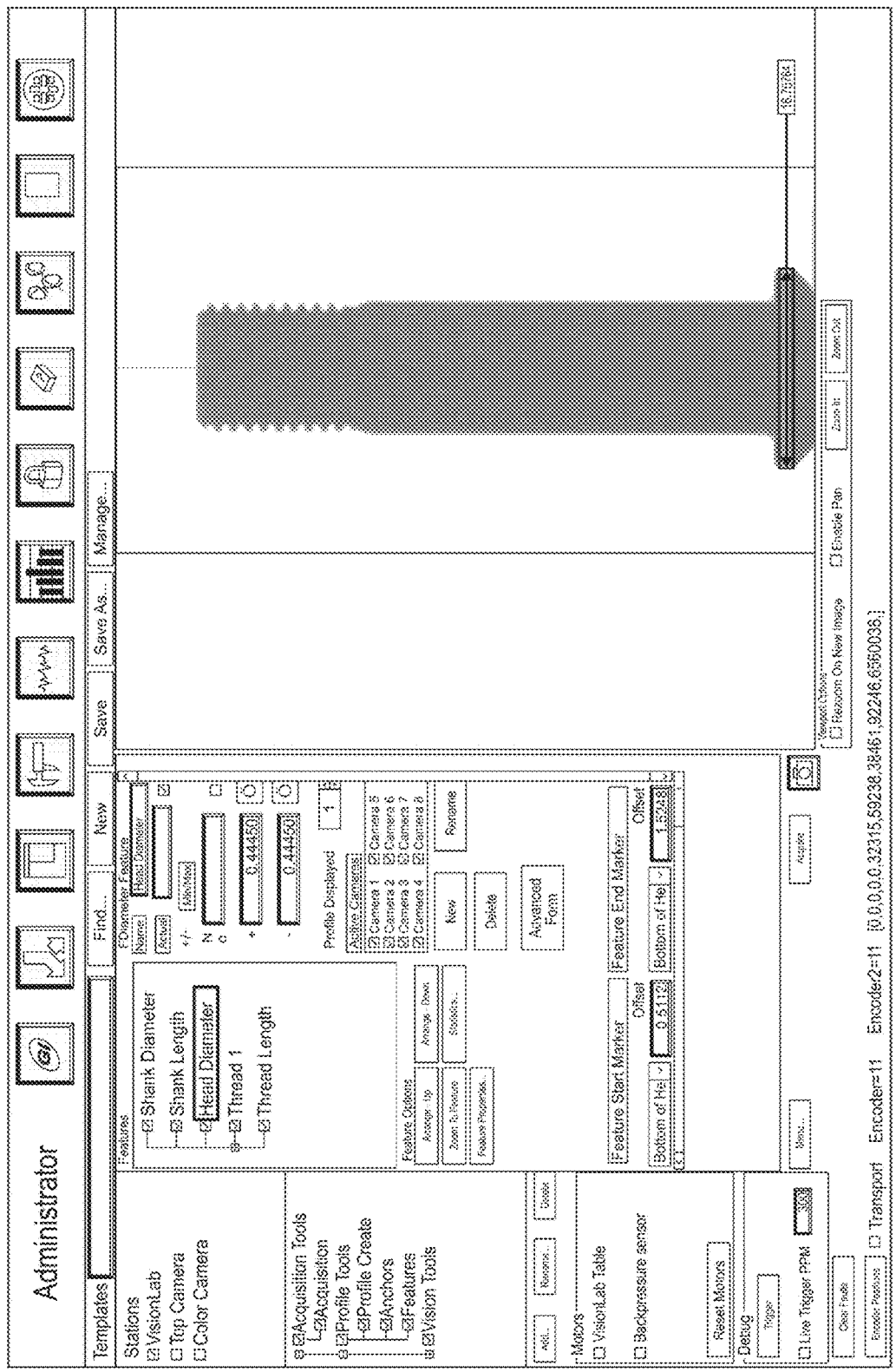
FIG. 25 is a view similar to the views of FIGS. 23 and 24 with particular emphasis and the diameter of a head of the fastener.
Figure 26:
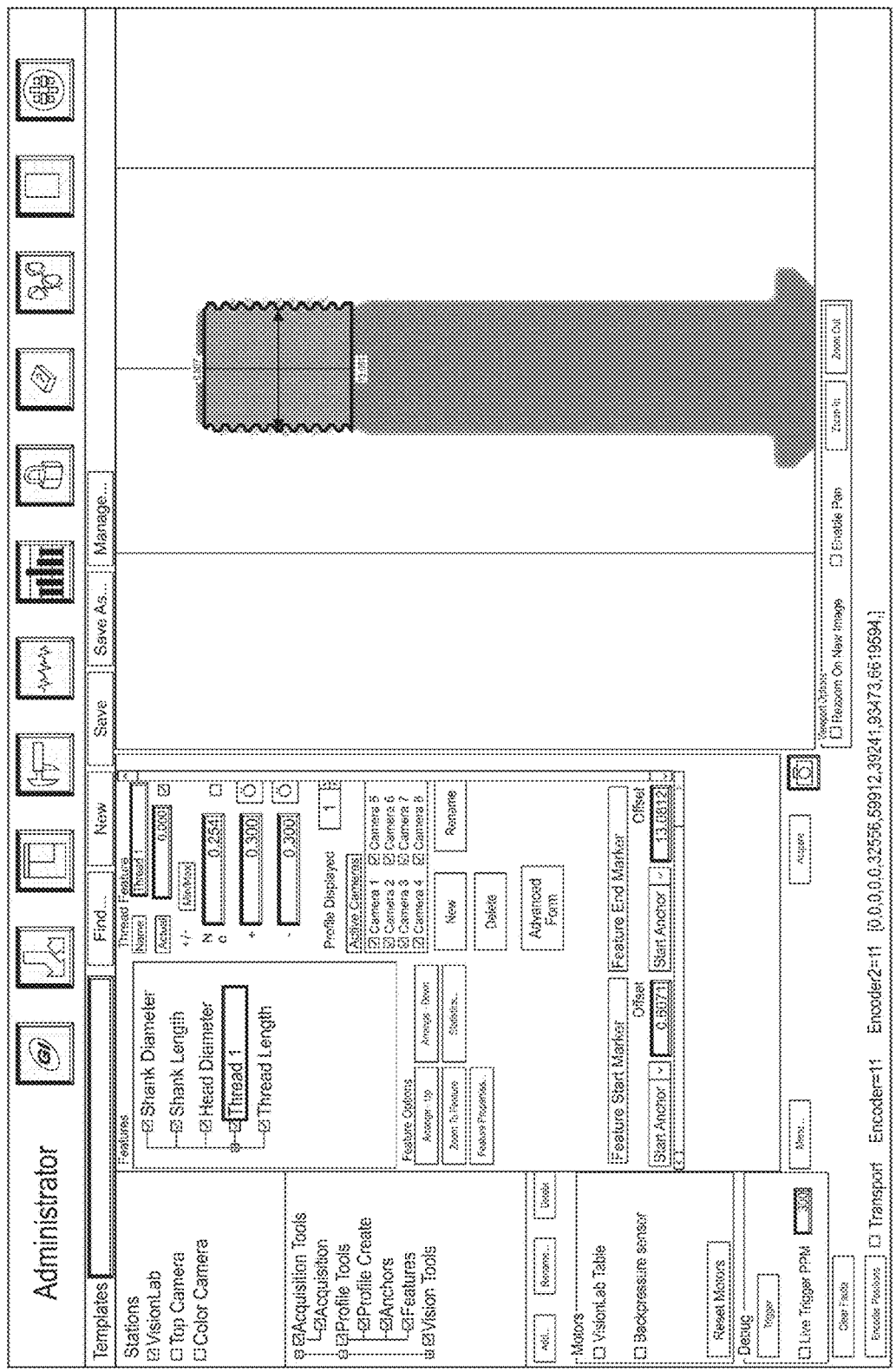
FIG. 26 is a view similar to the views of FIGS. 23, 24 and 25 and partially illustrating a 3 wire thread modeling algorithm (such as the thread model described in the '278 patent noted above)
Figure 27:
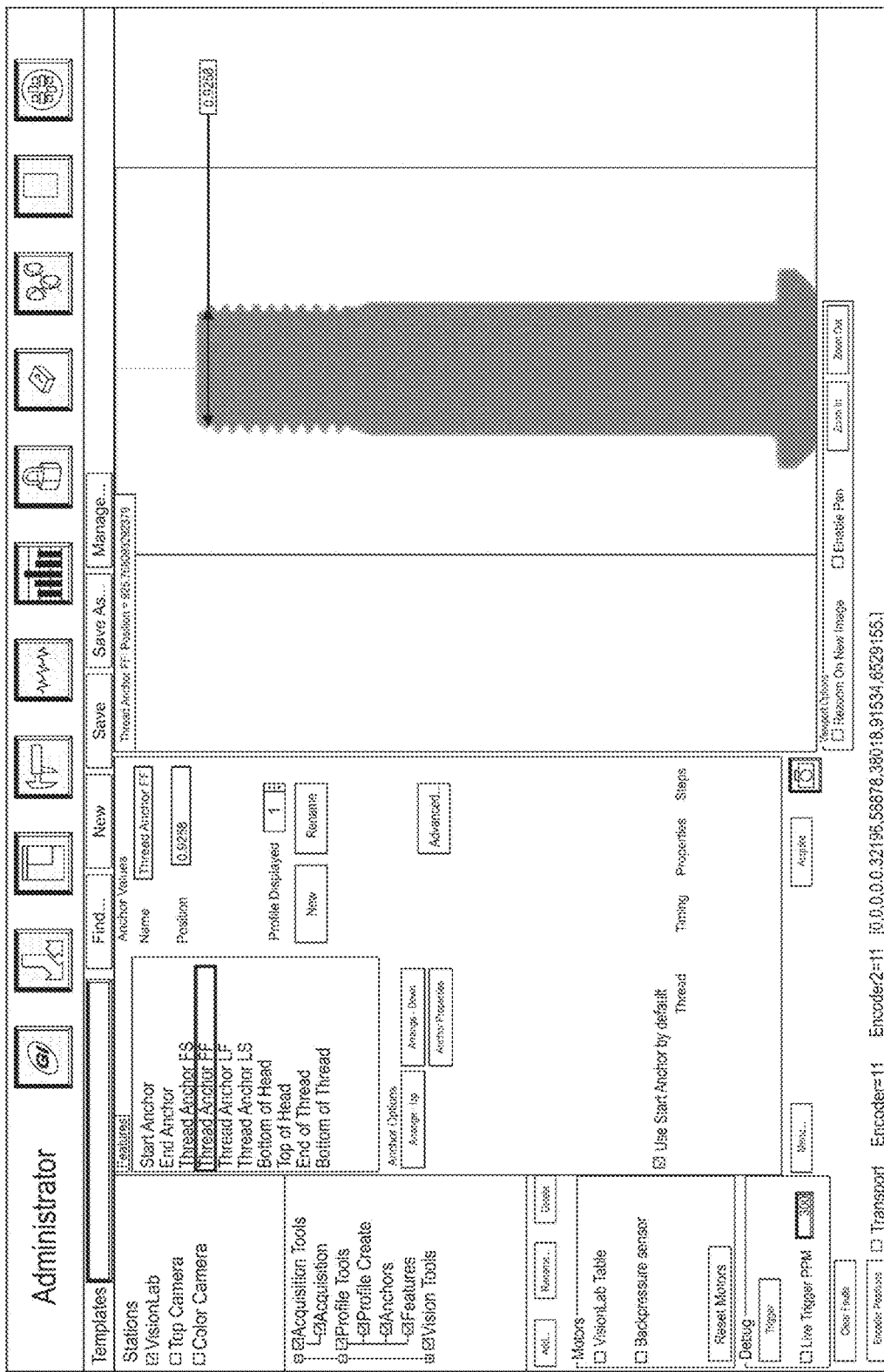
FIG. 27 is a view similar to the views of FIGS. 23, 24, 25 and 26 with particular emphasis on a thread anchor.
Figure 28:
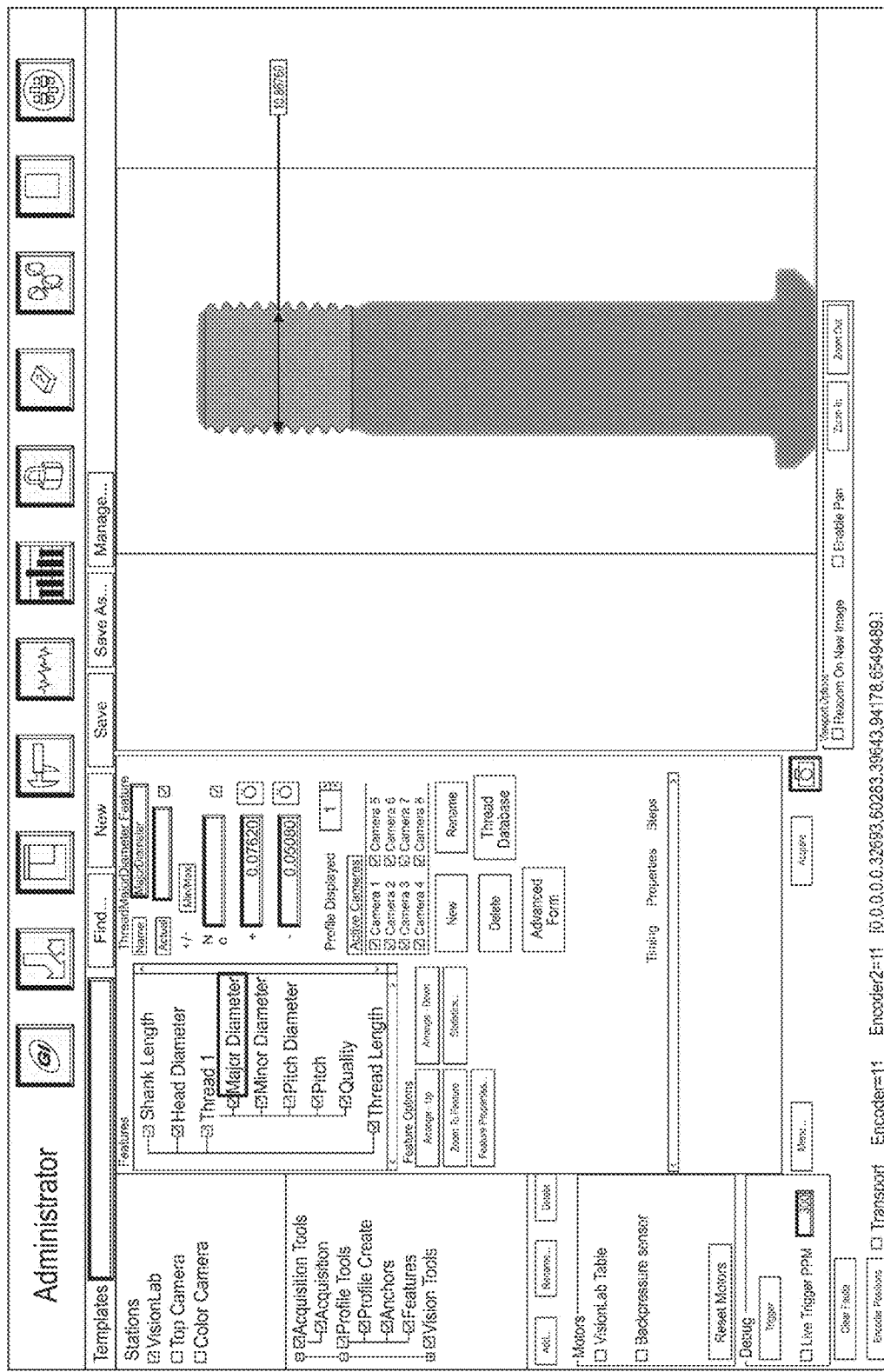
FIG. 28 is a view similar to the views of FIGS. 23, 24, 25, 26 and 27 with particular emphasis on a thread major diameter.

Capabilities of the VisionLab station or subsystem (i.e. ARIS Inspection Station) include:

Side-View Dimensional Characteristics
Diameters
Threads
Tapers
Lengths
Concentricity
Straightness
Radii
Length from specified diameter (head protrusion)
Diameter from specified length position
Parallelism/Perpendicularity
TIR
Theoretical Intersection
Formula
Surface Characteristics
Seams
Cracks
Visual Defects
Internal Thread Inspection (with the liquid lens technology)
Color Camera (with the Liquid Lens Technology)
Plating Inspection, color verification
Top and Bottom-View Inspection (Top View with the Liquid Lens Technology)
Head Stamp Verification
Visual Defects (bottom surface)
Head Diameter
Head Roundness
Drive/Recess Inspection Referring now to FIGS. 18a, 18b and 19 (FIGS. 9 and 10 of U.S. Pat. No. 10,207,297), as described in U.S. Pat. No. 10,207,297, each of the inspection systems has a measurement axis 13. A set of optical inspection devices of a first embodiment of the system is illustrated in FIGS. 2, 3, 9 and 10 of the '297 patent. Optical inspection devices of the system 10 typically include a high-speed, high resolution camera, a lens, an optical depth sensor (such as a triangulation-based sensor), back lighting, front and/or top lighting or illuminator, a top camera, bottom lighting or illuminator and a bottom camera.

Example self-standing parts, such as threaded parts with ball-shaped end portions and a threaded fastener or bolt, has threads, a length between its ends, a width, and a part axis which, preferably, is central to the part and parallel to its length. A variety of manufactured parts which may be inspected are shown in the drawing figures, including FIG. 1 of the '297 patent. In one example embodiment, the parts may have a length of 10", a diameter of 2", a length repeatability of 10 microns, a diameter repeatability of 2 microns, and an inspection speed of about 7 parts per minute. Also, typically the self-standing parts are capable of rotating without falling over (i.e. without the need for a part fixture).

The threaded bolt 36 is supported on a transparent (i.e. scratch-proof glass, plastic, or sapphire) window 11 of the motorized rotary or rotation fixtureless stage 14. The part is able to stand on and rotate with the window 11 without falling over (i.e. the part is capable of staying up or upright) without the need for a part fixture (i.e., the part is self-supporting).

As shown in FIG. 18A, a weight sensor 16, preferably comprising a load cell, may be coupled at the lower surface of the window 11 to measure weight of the part supported on the window 16 to help identify the part. The load cell is electrically connected to the system controller to provide a signal which represents the weight of the part.

The weight sensor 16 may be implemented as a strain gauge including a strain gauge load cell and resistive wire connected to a load plate coupled to the bottom surface of the window 11. The load plate and the window 11 typically displace a small distance corresponding to the part weight.

The weight sensor 16 alternatively may be a piezo-based weight sensor, a QTC sensor, a capacitance-based weight sensor or an inductance-based weight sensor to measure microgram or milligram changes in weight caused by the weight of the part on the top surface of the window 11.

Because the part is self-supporting on the transparent window 11 of the stage 14 without the need for fixtures or other devices, top and bottom cameras and corresponding strobed illuminating LED ring lights are provided to obtain top and bottom end views of the part, respectively. The rotation stage may be a precision rotation stage having relatively large (i.e. 100 mm) central aperture over which the transparent window is fixedly secured to rotate with an annular plate. An encoder 15 (i.e., FIG. 18a) provides an output signal based on the amount of rotary movement of the window. Such rotary stages are available from PI micos and may utilize a DC servo motor with a rotary encoder on a rotary shaft of the motor or a stepper motor. A worm drive with a high gear ratio may be provided between the shaft and the annular late for precision angular positioning of the transparent window, and, consequently, the part.

The bottom vision subsystem includes the bottom lighting and the bottom camera 210 both of which are located below the glass window as shown in FIGS. 2 and 9 of the '297 patent at a bottom imaging location. The camera 210 is preferably a single view camera with image analysis software that minimizes surface and lighting variations. The lighting illuminates the part.

Detects which the bottom vision subsystem can detect with respect to the part:
Min thru-hole;
Cracks on flange;
Functional OD Hex;
Cracks on ball portion;
Flange side ID cracks; and
Top and bottom ID crack.

The illuminator and the lens detector subsystem (i.e. camera) may be replaced by a high-speed 2D/3D laser scanner available form Keyence Corporation of Japan.

The rotary part stage 14 typically includes an electric actuator or motor which may be stepper motor or a DC motor.

Figure 1:
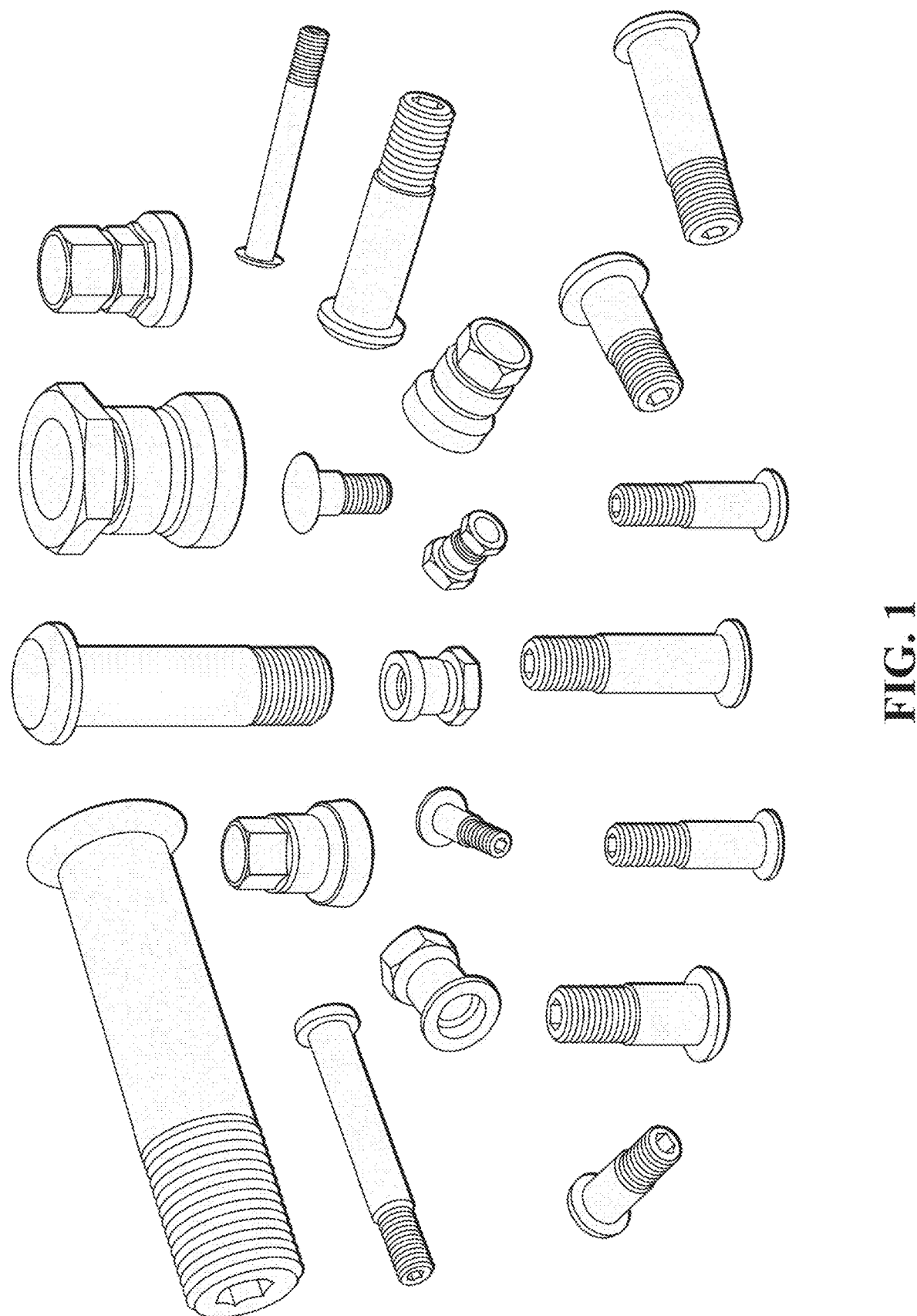
FIG. 1 is a side perspective view of various threaded and non-threaded aerospace fasteners having various features and possible defects that can be extracted and measured using at least one embodiment of the present invention.

The parts of FIG. 1 of the '297 patent can be rotatably driven by the motor via motor-driver or controller via system controller while being supported vertically (i.e., the parts are self-supporting) as shown in FIG. 9 of the '297 patent.

The various components or functions of the motor driver or controller of FIG. 9 of the '297 patent may be implemented by the separate motor controller as illustrated, or may be integrated or incorporated into the system controller, or other controller, depending upon the particular application and implementation. The MCU (i.e. motor control unit) typically include the control logic to control the rotary stage 14. The control logic may be implemented in hardware, software, or a combination of hardware and software.

One or more memory devices within the system controller and/or the motor controller may store a plurality of activation schemes for the rotatable window 11 and may represent any one or more of a number of known processing strategies such as event-driven, interrupt-driven, multi-tasking, multi-threading, and the like. As such, various steps or functions may be performed in sequence, in a modified sequence, in parallel, or in some cases omitted. Likewise, the order or operation or processing is not necessary required to achieve the objects, features, and advantages of the invention, but is provided for ease of illustration and description.

Preferably, the control logic is implemented primarily in software executed by a microprocessor-based controller or the microcontroller (i.e. MCU). Of course, the control logic may be implemented in software, hardware, or a combination of software and hardware depending upon the particular application. When implemented in software, the control logic is preferably provided in a computer-readable storage medium having stored data representing instructions executed by a computer to control angular position and rotation of the window 11 of the system 10 through the rotary stage 14. The computer-readable storage medium or media may be any of a number of known physical devices which utilize electric, magnetic, and/or optical devices to temporarily or persistently store executable instructions and associated calibration information, operating variables, and the like.

In one example embodiment, the stage 14 is electromechanically driven by a rotary actuator such as the DC motor 28 and associated transmission (not shown) in the form of a worm gear or the like. The DC motor may be, for example, a brushed or brushless DC servomotor, the operation of which is controlled by the motor controller via a motor drive or driver within the motor controller. The brushed or brushless motor may have its rotary speed and position controlled by pulse width modulation (PWM) control.

The motor controller outputs motor drive commands to the DC motor based on outputs from the rotary encoder 15 and/or decoded commands from the system controller. The motor controller controls the DC motor through the motor drive of the motor controller so that the angular position of the stage 14 is changed. In other words, the system controller outputs servomotor drive commands to the motor controller which controls the DC motor and, through its transmission, the stage 14.

As described in U.S. Pat. No. 8,550,444 (also owned by the assignee of the present application), the system 10 may include a part-centering and aligning subsystem. The subsystem or apparatus ensures that a part is centered in the system 10 and that the part is aligned with the measurement axis (Z-axis) 13 without the need to measure any distances or angles. In other words, the apparatus ensures that the part is properly placed or positioned on the window 11 in the system 10.

As described in U.S. Pat. No. 8,550,444, the part-centering apparatus typically includes a carrier which defines a part receiving cavity. The apparatus also has a central axis substantially parallel to the measurement axis 13 or Z-axis and includes a plurality of members or levers having open and closed positions. The members having holding faces which are substantially equidistant from the central axis during movement between the open and closed positions. At least one of the members applies a force on an exterior side surface of a part, disposed between the holding faces during movement between the positions to reposition the part. The repositioned part is centered and aligned with respect to the measurement axis 13. The holding faces releasably hold the repositioned part in the holding position between the open and closed positions of the members.

The part-centering apparatus may also typically include automatically operable lever arms which are coupled to their respective relatively moveable, spring-biased ring members of the carrier. Movement of one of the lever arms either towards or away from the other lever arm (depending on the biasing of the spring(s)) causes the members to move from their open position to their holding position against the part to center and align the part.

The system 10 may also include a moveable stage subsystem coupled to the part-centering apparatus for sliding the apparatus relative to the repositioned part along the central or measurement axis in the open position of the members to allow the exterior side surface of the repositioned part to be measured. In turn, the slide/base unit moves the moveable stage subsystem up and down. A horizontal support member couples the subsystem to the apparatus to move the apparatus along the central or measurement axis 13.

The system 10 may further include a mechanism which is coupled to one end of the support member for translating the support member and the apparatus a limited extent relative to the subsystem along the central axis.

Referring again to FIGS. 3, 9 and 10 of the '297 patent, the system also includes a backside illumination assembly, generally included at 300. In general, back lighting provides measurement of profile characteristics. This provides maximum, minimum or average measurements, simultaneously or separately for features like: Radii Concentricity, Straightness, Lengths, Diameters and Threads for threaded parts.

The illumination assembly 300 directs a beam of collimated radiation at substantially the entire backside surface of the self-supporting part 36 at predetermined angular increments of movement of the part about the measurement axis 13 of the system 10 during a rotational scan. The beam is occluded by the self-supporting part at each increment of movement to create a stream of unobstructed portions of the beam in rapid succession passing by and not blocked by the self-supporting part.

Preferably, substantially the entire backside surface is completely enclosed by a beam profile of the beam. The beam profile is generally rectangular with a height greater than or equal to the length of the part and a width greater than or equal to the width of the part as shown in FIGS. 18 and 19.

The assembly 300 may be moveable up or down via a motor driven or controlled by a driver/controller upon receiving a control signal from the system controller as shown in U.S. Pat. No. 9,370,799.

The illumination assembly or radiant source 300 illuminates an object such as a threaded bolt to be imaged, and a telecentric optical lens 302 (i.e. FIGS. 2, 3, 9 and 10 of the '297 patent) receives the radiation passing by and not blocked by the part and guides it towards an image plane of the image acquisition device or detector, generally referred as 304. Consequently, the radiation source 300 preferably comprises a LED emitter including a plurality of LED emitter elements serving to emit radiation in either the visible or ultraviolet range. The LED emitter of the source 300 is preferably high power, capable of generating 100 optical mW or more for each emitting element. A lens (not shown) collimates the radiation.

As shown in U.S. Pat. No. 9,370,799, the back light 300 and the detector 304 may be coupled together by a yoke to rotate together about the part 36 via a motor via a driver/controller upon receiving a command signal from the system controller.

An optical or optoelectronic device for the acquisition of images (for example the camera or telecamera 304) has the image plane which can be, for example, an electronic sensor (CCD, CMOS). The self-supporting fastener, bolt or other manufactured part, is received on an retained at a position and orientation for optical inspection by the fixtureless transparent glass or plastic of the window 11 of the system 10. Preferably, the device 304 is a high speed, high resolution digital telecamera, having an electronic sensor with individual pixels of lateral dimensions equal to or less than one or more microns.

As shown in U.S. Pat. No. 9,370,799, the assembly 304 can be driven up and/or down by a motor via a driver/controller upon receiving an appropriate control signal from the system controller. Typically, movement of the assembly 304 and the backlight 300 is coordinated by the system controller so that they move in unison.

As described in U.S. Pat. No. 9,370,799, the lens 302 typically comprises a forward set of optical elements proximal to the manufactured part, a rear optical element proximal to the acquisition device and an aperture diaphragm interposed between the forward and rear sets of optical elements. The aperture diaphragm comprises a circular window transparent to the radiation, which is referred to as a diaphragm aperture. For example, the aperture diaphragm can comprise an opaque plate preferably of thickness of a few tenths of a millimeter, and the diaphragm aperture can be defined a simple hole in the plate.

The diaphragm aperture or window is coaxial to the optical axis of the forward set of optical elements, and positioned on the focal plane of the forward set defined for the wavelength range of radiation emitted by the radiant source.

The position of the focal plane of a set of optical elements mostly depends on the refraction index of the material from which the lenses are made, which, in turn, depends on the wavelength of the electromagnetic radiation passing through the lenses.

The lenses 302 only accepts ray cones exhibiting a main (barycentric) axis that is parallel to the optical axis of the forward set. Thereby the lens 302 is a telecentric lens configured for the particular radiation. The rear set of optical elements serves to compensate and correct the residual chromatic dispersion generated by the forward set optical elements for the wavelength in question.

The optical axis of the rear set coincides with the optical axis of the forward set and the focal plane of the rear set defined for the wavelength cited above, coincides with the plane on which the aperture diaphragm is located. Consequently, rays of radiation conveyed by the rear set towards the image lane form light cones, the main (barycentric) axis of which is parallel to the optical axis of the lens 302.

The forward set preferably includes two positive lenses, which can exhibit a flat-convex, bi-convex, or meniscus shape. The positive lenses can both be made in common optical glass. For example, they can both be made in low chromatic dispersion crown glass.

The rear set of optical elements preferably comprises four lenses. The lens which is proximal to the diaphragm can be a negative lens serving to partially or completely correct the chromatic aberrations generated by the forward set. The negative lens can be bi-concave, flat-concave, or meniscus shaped, and can be made of common optical glass. For example, it can be made of high chromatic dispersion flint glass.

The three rear lenses are positive lenses that can all be made of optical glass, for example, in low chromatic dispersion crown glass.

The lens 302 is therefore both telecentric on the object side and telecentric on the image side, and overall the lens 302 is a bi-telecentric lens configured for light such as visible light or ultraviolet light.

Dimensional features that can be measured via the above-described side vision devices include:

Diameters;
Tapers
Lengths
Concentricity
Straightness
Parallelism
Perpendicularity
Threads
Pitch
Major Dia
Pitch Dia Referring now to FIGS. 9 and 10 of the '297 patent, there is illustrated a triangulation-based sensor head, generally indicated at 400. Alternatively, the device 400 may comprise a color camera having a liquid lens. The offset color camera 400 preferably utilizes liquid lens technology and advanced image analysis software that minimizes surface and lighting variations. A strobe LED ring light illuminates the outer diameter surface for dedicated coating/color inspection. The liquid lens technology allows the camera to stay stationary and not move because the effective focal length of the camera lens can be electronically controlled. Color inspection is thus provided for proper fastener coating, color and quality.

The sensor head 400 may comprise a high-speed, 2D/3D laser scanner available from Keyence Corporation of Japan. Such a sensor head from Keyence generates a laser beam that has been expanded into a line and is reflected from the side surface of the part as well as any radially extending surfaces of the part, such as the threaded bolt 36. The reflected line of light is formed on a sensor, and by detecting changes formed on a sensor, and by detecting changes in the position and shape of the reflection, it is possible to measure the position of various points along the surface of the part.

Alternatively, during the scans of the side profile, a laser line may be painted on the part and a vision subsystem positioned on either side of the laser line receives reflected laser light and the resulting images provides a 3D image (including Z axis or depth). In this way, both visual defects and measurement features or characteristics that require a depth component are simultaneously extracted.

Alternatively, (not shown herein but shown in U.S. Pat. No. 9,370,799 the entire disclosure of which is hereby incorporated by reference herein), the sensor head 400 may rotate and/or linearly move via a motor via a rotary driver/controller and/or a linear driver/controller, respectively, upon receiving command signals from the system controller. A transmission may convert the rotary motion of the motor output shaft to linear motion.

As the manufactured part rotates, corresponding sets of 2D profile signals are generated by the sensor head 400. At least one processor processes the sets of 2D profile signals to obtain a 3D view of the complete side and any radially extending surfaces of the part.

The system controller provides control signals based on the signals from the rotary sensor or encoder 15. Alternatively, sensor(s) and/or encoder(s) are not required if stepper motor(s) are provided. Alternatively, or additionally, the signals from the rotary encoder 15 are directly utilized by the sensor head 400 at the station to control the sensor head 400. The control signals are utilized to control the sensor head 400 which preferably have encoder inputs which allow precise control over the position of 2D profile signals samples.

At least one signal processor may process the sets of 2D profile signals to identify a defective part as described in greater detail in U.S. Pat. No. 9,370,799, also owned by the assignee of the present application. The at least one processor may process the sets of 2D profile signals to obtain one or more measurements of the part.

The operator may tell the system controller via a display 500 and user interface 502 (i.e. FIG. 18*a*) where the interesting parameters are located on the Z axis (height of the part). Then, the software tools extract and measure features from the images and resulting 2D profile signals created by the reflected lines of radiation.

The 2D profile signals may be processed by the at least one processor under system control to obtain a 360 degree panorama composite view or image which is used by the processor to determine at least one of a dent, a split, a perforation, a crack, a scratch, a wrinkle, a buckle, or bulge, and a surface blemish located at the side surfaces of the part where the part is an ammunition case or a fastener 36.

A top vision subsystem typically includes the frontside illumination device which may include the strobed ring LED illuminator 350. The illuminator 350 typically includes a curved array of LED light sources, groups of which are under control of the system controller to provide direct illumination of the front of the case or fastener 36 and are used to enhance defects in the front surface of the fastener or bolt 36. Alternatively, the frontside illumination device may be side-mounted so that the front light comes from the side of the part and not from above the part, i.e., basically like painting a thin line along the length of the part.

The top vision subsystem also typically includes a single view camera with image analysis software that minimizes surface and lighting variations. A lens of the camera may also utilize liquid lens technology as described above. Lighting which illuminates the part includes software. The lens of the camera may be up to 2 inches in diameter. The top vision subsystem may detect such defects as castle chip out; functional ID Hex; and top and bottom ID cracks. Front lighting provides surface defect detection for tool chatter, cracks and other surface imperfections.

The detected optical images are processed by the image processor to determine at least one of a dent, a split, a perforation, a crack, a scratch, a wrinkle, a buckle, a bulge, and a surface blemish located at the side surfaces of the fastener.

Referring to FIGS. 18A and 19, there is illustrated an eddy current sensor which includes coils (not shown) which not only induce an eddy current in the rotating part but also senses the induced eddy current to provide a signal to eddy current electronics which represents the amount of induced eddy current. Typically, the sensed eddy current is compared with an eddy current signature of a "good" part. The eddy current sensor and electronics can be used to inspect for various metallurgical defects such as seams, cracks, porosity, heat treat variations and conductive plating variations.

Referring to FIG. 19, the system may include a commercially available X-ray fluorescence (XRF) analyzer to determine the composition of a metal alloy of the part when the part is supported on the window 11. Typically, X-ray fluorescence is detected or sensed by a detector connected to electronics which, in turn, may provide a signal which is converted into a signature that is subsequently compared to signatures of reference materials in order to identify and/or classify the material of the part.

Data/Image Processor for the Detection of Surface Defects on Small Manufactured Parts The vision system is especially designed for the inspection of relatively small manufactured parts (i.e. especially the parts of FIG. 1) which typically have a diameter of 1 mm to 50 mm and a length of up to 228 mm. The processing of images of the cartridge cases and like parts to detect defective cases is generally described in issued U.S. Pat. No. 7,403,872 which also describes the processing of sensed induced eddy current.

At least one embodiment of the present invention utilizes many of the teachings found in U.S. Pat. No. 7,633,635 ('635 patent), assigned to the assignee of the present application to automatically identify unidentified mixed fasteners.

This embodiment (of the '635 patent) has a part setup procedure for a user to capture an image of a known dimensioned part and define a set of features with acceptable range of limit values for them. The part profile and features are referred to as the part template. During part ID mode, the profile of each inspected part is captured and its features are compared to their limit values. If any feature of a part is determined to be outside its range of limits, then it is not identified.

Referring to FIG. 1 of the '635 patent, there is illustrated one embodiment of a system, generally indicated at 20, for automatically identifying non-identified fasteners. Such fasteners may include, as illustrated in FIG. 1, fasteners, whether threaded or not, such as nuts, bolts, nails. Such fasteners may include flat parts such as washers or cylindrical or near-cylindrical (i.e., have a small cosine error) parts such as plastic tubular members. The fasteners may be at least partially conductive, semiconductive, or conductive. The fasteners may be plated or non-plated, heat-treated or non-heat-treaded, or include seams. Typically, the fasteners may have a diameter range of 2 mm to 35 mm and a length range of 10 mm to 150 mm.

The data and signal processing system described therein (i.e. the '635 patent) illustrates how the system processes sensor data and discovers the ID of the fastener presented to the system. Using calibration data, sensor data is transformed to a description of the outline of the fastener, specified in calibrated physical coordinates. Feature processing extracts values for each feature contained in the entire part template data set. Match metric processing identifies the best match to the sensor data among the fastener templates. ID generation evaluates the best match; if the match is good enough, the part is said to be identified, otherwise the part is not identified. After ID generation, a message is sent to the master computer containing the part ID or a "not matched" indication.

When a new part is added to the system 20, a file called a "template" is automatically created as described in detail hereinbelow. The template file contains information about the fastener that is used to identify it. The template is set up so that any fastener of the given type will match the template, and any fastener not of the given type will not match.

When a robot 21 of the present application places a self-supporting fastener to be identified on its fixtureless stage 14, the software acquires data containing the profile and eddy signature of the fastener. The software then checks all the templates in the list to find a match. If the fastener matches one of the templates, then the fastener is identified. If none of the templates match, the fastener is not identified.

In general, when setting up a new fastener, the user chooses "features" of the part to be measured. The measurements of the features will distinguish the new fastener from the other fasteners in the system. The types of features include total length, internal length, diameter, thread, taper, and eddy current signature. For most features, the user chooses a region of the fastener where the measurement will be made, a nominal value of the measurement (the value the fastener should have if it's the right fastener, and plus and minus tolerances which determine if the measurement is close enough to match the fastener. For some features, such as total length and eddy current, the measurement region is the whole fastener. Also, for eddy current the user chooses a rectangular on the eddy screen of a display instead of a nominal value and tolerances. If the eddy signature hits the rectangle, then the fastener is a match.

The user chooses which features are needed to distinguish the new fastener. For a wire nut, for example, the user would typically add a total length feature and a taper feature. A bolt may need total length, thread, and one or two diameters. If it is necessary to distinguish the type of material or coating to distinguish a bolt from one another bolt, the user would add the eddy feature.

When all of the necessary features have been set up automatically in a template, the user saves the template. This is added to the list of templates to check when a fastener is in the part identification operation, as previously described.

More particularly, in automatically creating a template a gold or master part with known good dimensions is not typically used. An image of the fastener is displayed on a screen, as generally shown in the screen shot of FIG. 6 of the '635 patent.

After a good image of the part is automatically obtained, features automatically are added to the template as previously mentioned. For example, when adding an internal length, points are determined on the fastener when one wishes to measure the internal length (i.e., here the length of the head of the bolt). One can add multiple internal lengths for each fastener. Internal lengths can be use to measure features like: thread length, shoulder length, head height, under the head to the start of a part, and any length measurement needed inside of a fastener.

Such predefined points are also useful for other template features like diameters and tapers. Such predefined points are useful when looking for rising and falling edges of the fastener as well as when looking for minimum and maximum diameters of the fastener.

The diameter feature is used to measure diameters around the fastener. Multiple diameters can be added for each fastener. One can select minimum and maximum diameters for a selected area (or a small groove within a selected area) or one can average all the diameters in the area selected.

With respect to taper features, tapers are used to measure tapered angles on a fastener. Multiple tapers can be added for each fastener.

The external/overall length feature is automatically added to the list of features. With respect to the thread features, the tolerances on the following thread features can change: thread count, thread pitch, pitch diameter, functional size, lead deviation, minor diameter, and major diameter.

With respect to the code, the designated code can be entered on a touch screen to identify the fastener corresponding to a particular template, which also shows various features of a bolt.

With respect to eddy current, a frequency parameter is initially set up for a particular fastener. A relatively low frequency such as 1 KHz may be used to check for material and a relatively high frequency such as 50 KHz may be used to check for plating of a fastener. A template for eddy current is automatically generated. After obtaining a signature, one may have to adjust the parameters of the frequencies and the gains while testing a good fastener, until a good image is obtained on the screen of a display. A good image should have a defined area, like a loop, that will have some space inside it. After establishing the eddy current signature of a good fastener, the area of the signature one wants to inspect may be highlighted.

Referring now to FIGS. 6, 7, 8 and 10-17 of the present application, after possible fastener identification and inspection, the inspected fastener will be pushed off the VisionLab stage 14 via an electric cylinder 40 onto a rotary catch 42 that will route the part into a queue station and then onto a transport device of a precision linear slide, generally indicated at 46 (i.e. "6" in FIG. 2).

There are two linear slides or post inspection conveyors 44, one for each VisionLab output. These slides 44 receive the parts into basket-like, transparent devices 45. Each part is transported to one of a plurality (i.e. here 40) of bin locations 49. Once a transport device 45 arrives at the proper bin location 49, an electric part pusher cylinder 46 pushes the part out of the basket-like device 45 and into one of six locations 49 of a bin module assembly 48 ("7" in FIG. 2). Once the part is removed, the transport device 45 of the slide 44 ("6" in FIG. 2) returns to the VisionLab ("5" in FIG. 2) to pick up the next part.

Good Part Transport to Holding Bin Location of Bin Assembly

The high speed linear slides 44 transport accepted parts in holding cups or devices 45 that the parts fall into after the VisionLab inspection. One high-speed slide 44 is dedicated to each VisionLab. Each transport cup 45 takes each accepted part to the assigned bin 49 of one of the bin module assemblies 48 and the cylinder 40 pushes the part, allowing the part to transition into a particular bin location 49 within the designated assembly 48. The transport device 45 then returns via its slide 214 to retrieve the next accepted part from its VisionLab.

Reject Chute

Bad parts are sorted out to a reject bin (not shown). Rejected parts will drop into the first "bin" location which is designated for fail parts only "containment bin."

Each of the good bin locations 49 will know what part number and quantity reside in that bin location 49 via the master controller. Once the pre-determined quantity of parts has been met at a particular bin location 49, the floor 51 of that bin location 49 will be slid out by an electronic cylinder 51 having a gripper allowing the parts from that one bin location 49 to drop onto a bagging conveyor 53 (i.e. "8" in FIG. 2).

The bagging conveyor 53 then transports the parts to a bagger machine of a bagging system 52 (i.e. "9" in FIG. 2) and the bagging machine executes packaging and labeling functions under control of the master controller.

Good Part Holding Station/Bins

Once the parts are removed from its bin location 49 and transported to the bagging machine, the bin location 49 becomes available for the next successfully passed part to occupy.

Conveyor System Transfers Parts to Bagger Machine

Full bins 49 are opened to the bottom bagging conveyor 53. Once a bin location 49 is emptied, it is assigned a new part number.

Bagging System

Good parts enter the bagging system 52 from the transfer or bagging conveyor 53.

The bagging system 52 prints labels with part number and lot information, places the labels on the bags and finishes with sealing.

Referring now to FIGS. 20-28, there is illustrated an automatic template generation method and system as follows:

1. Customer Provides Part Print Data in a pre-defined Spreadsheet Format of FIG. 20 (Features, Dimensions, Attributes and Tolerances). This is done automatically using an algorithm which pulls the data that the customer has developed.

2. Spreadsheet Data Uploaded in to a VisionLab Database of FIG. 21

An import utility takes the spreadsheet data and converts it into a format that the database can use.

3. Database data is transferred into VisionLab Fastener Inspection Templates by Part Number A physical fastener from a family of fasteners can be utilized to "train" and set up the template. The software uses the information in the database to take the "trained" regions and automatically grow or shrunk them depending on the size of the fastener.

Fastener templates created through the spreadsheet data transfer process described above include:

1. Part Number
2. All Selected Features
3. All Dimensions and Tolerances
4. Visual Defect Detection Regions of Interest and Level Settings As noted in FIGS. 22a through 28, such selected features may include shank diameter, shank lengths, and head diameter and various thread fastener features such as thread lengths, major and minor diameters, and pitch diameter.

As further described, the spreadsheet is created and provides all the data needed to identify the part including: Part number, Part Family, Measurements and Attributes. Software is used to read each line of the spreadsheet and populate the information into objects. The data is dynamically read as there can multiple options for each bolt, nut and collar that change the finish of the part or modify the measurements.

After all the data is read from the spreadsheet, it is populated into the database using 4 normalized tables. The first table stores each family type with the date it was added into the system and the type of part that family provides (bolt, nut, collar, sleeve, etc.). The second table stores the full part number, and each value of the part number broken down. Lastly, the data for each part is stored between two tables. One table stores the measurement values as minimums, nominals, maxes, ranges and the other table stores attribute values such as true/false, colors and string values that match items such as head types.

Lastly, using the data an overlap report is generated. The overlap report sorts all the part objects and compares the measurement values to find where all the measurements are an exact match.

General Machine Overview

As previously described, a vibrating feed table divides the parts by part height into 3 lanes. The parts are vibrated down each lane onto a slow-moving conveyor. Parts go through an optical sensor such as a camera that allows robots to identify the orientation and length of the part. The robots will then move into position to pick up the part. There are 3 grippers on each robot that allow them to pick up a range of part sizes. The robot will move with the correct gripper to grab the part and place it onto the center of one of the Vision Labs. Each robot has its own Vision Lab. The Vision Lab stage will then spin and images of the part are collected to identify it. After the Vision Lab has completed its cycle and has all its results, it will push the part off the table or stage and spin to dump the part down a chute. After the part falls it will be added into the queue station. The queue station can hold one part.

A cup attached to a slide will collect the part from the queue and deliver it to the appropriate bin location. Each bin location will hold one type of part. When the cup gets to the correct bin it will open to allow all the parts to fall into the bin. There are 42 bins in total: 1 bin for failed parts, 1 bin for dumped parts, and 40 bins for good identified parts.

When bins get full, or the number of bins runs out, the fullest bin is selected according to their max part count, another slide will go to the appropriate bin and pull a trap door to release the parts onto a lower conveyor. The parts will be pushed from the conveyor to a bagger which will be printed with a label. The label will contain the part information, a timestamp and how many parts are in the bag. The bagger will cycle and drop the bag onto a final conveyor which will take the recertified parts away.

Figure 29:
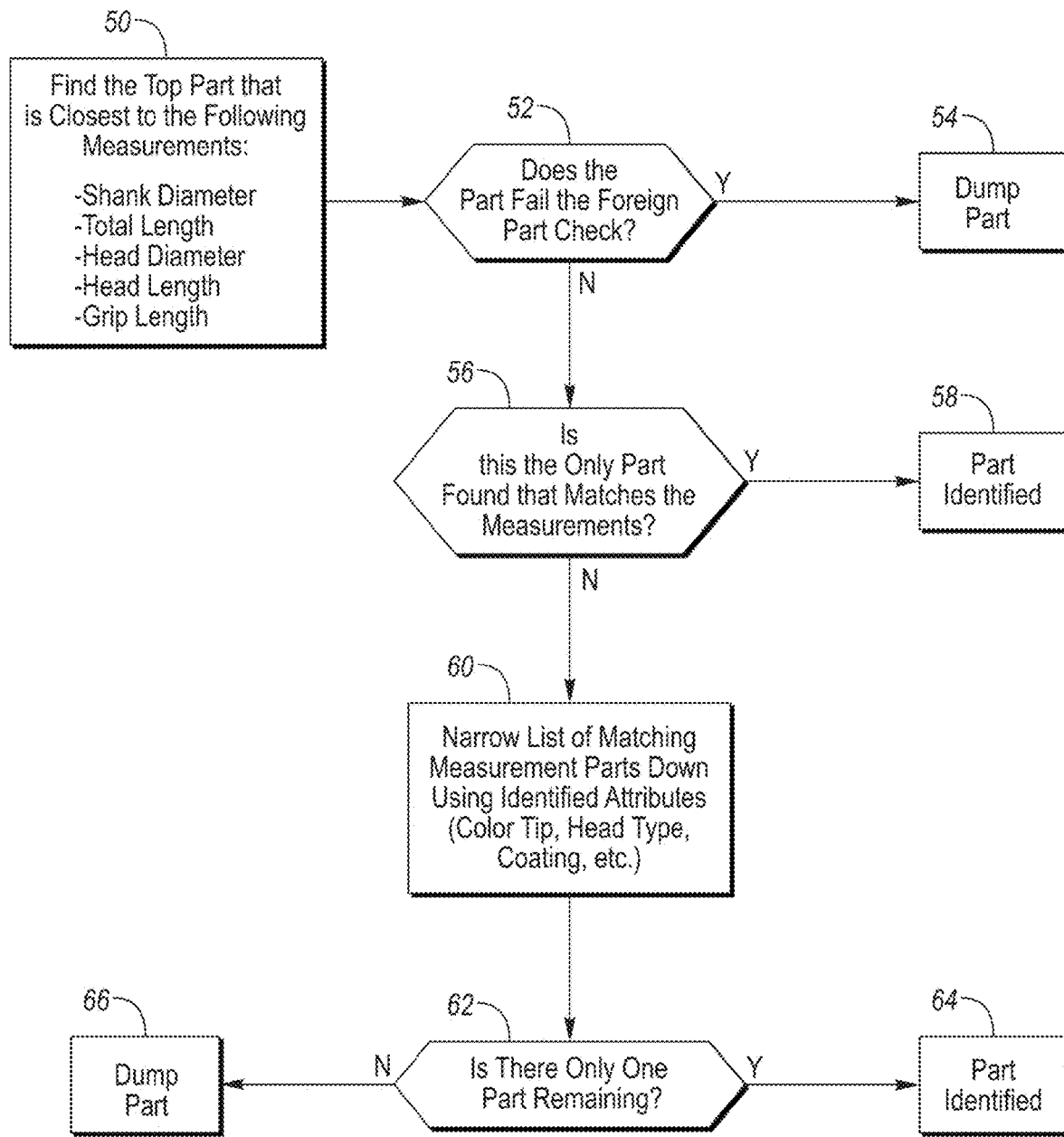
FIG. 29 is a block diagram flowchart illustrating a decision tree for identifying a fastener in at least one embodiment of the present invention.

Referring now to FIG. 29, there is illustrated a block diagram flow chart which shows the part/fastener identification process/method of at least one embodiment of the present invention.

At block 50, a top part is found that is closest to a number of measurements.

At block 52, if the part fails the "foreign" part check (i.e. the part does not have a corresponding template), the part is dumped at block 54. If the part doesn't fail the check, block 56 is entered.

At block 56, the question is asked if this is the only part found that matches the measurements. If yes, the part is identified at block 58. If not, block 60 is entered.

At block 60, the list of matching measurement parts is narrowed down using identified attributes.

At block 62, if there is only one part remaining, the part is identified at block 64. If not, the part is dumped at block 66.

In summary, the system 10 includes in each VisionLab inspection station:

Side Vision Profile Dimensional Inspection and Visual Defect Detection
   Bottom Vision with Front LED Lighting
   Top Vision with Front LED Lighting
   InternalView with Front LED Lighting
   Color Vision with Front LED Lighting MultiView Back Lighting: At the heart of VisionLab is the precise gauging side vision station that combines a high resolution CCD camera, telocentric lens, collimated back lighting with a smart motor and control logic. This combination provides 360 measurements per part (a measurement every degree of rotation) for unmatched repeatable profile measurements of part dimensional characteristics such as radii, concentricity, straightness, lengths, diameters, threads, tapers, etc. . . . . .

Software: Part templates are created through an automatic database operation for instant dimensions and tolerances of all pertinent part features. With thousands of parts requiring inspection, this process saves valuable set-up time.

Bottom Vision: Single view camera with advanced image analysis control logic that minimizes surface and lighting variations. A strobe LED ring light illuminates the bottom surface for dedicated inspection.

Inspections: Identify Head Markings and Inspect Recess/Drive Features.

MultiView Front Lighting detects surface imperfections such as—scratch gouges, flakes, burrs, smears, discoloration, chips, cracks, dents, damaged threads.

Using a sequenced lighting technique, milliseconds after completion of the 360 dimensional inspection, the parts are illuminated with top and bottom front LED lighting to provide the side cameras a view of the full surface of the part. As with the dimensional inspection, the VisionLab processes 360 surface inspection images (one image per every degree).

By processing 360 images, smaller surface defects are detected as the inspection window narrows to sections allowing more defined surface analysis.

Software: Part templates are created through an automatic database operation for instant visual defect detection. Defect analysis settings are preprogrammed per Region of Interest (ROI), as shown in the threaded region in the image of FIG. 22b.

Top Vision: Single view camera with liquid lens technology and advanced image analysis control logic that minimizes surface and lighting variations. A strobe LED ring light illuminates the top surface for dedicated inspection.

By providing the liquid lens, neither the camera nor its lens assembly is required to move for varying part lengths (i.e., the focal length of the liquid lens is electronically controlled).

Inspection: Top recess feature measurement and inspection.

Top Vision: Single view camera with liquid lens technology and advanced image analysis control logic that minimizes surface and lighting variations. A strobe LED ring light illuminates the internal surface for Inner Diameter wall inspection including internal thread defect detection.

By providing the liquid lens, neither the camera nor its lens assembly is required to move for varying part lengths (i.e., the focal length of the liquid lens is electronically controlled).

Inspection: Inner diameter walls for visual defects and internal thread inspection.

Identifying Parts Process Via the Flowchart of FIG. 29

Using machine vision, software images are taken that will take measurements down to the micron level for each region of the part. The measurements are then compared with the data extracted version (i.e. templates) to find the closest matching parts. When a handful of parts have been found, attributes are used to narrow down to the best possible choice. Attributes include: Coating, Color, Identification, Head Type, Drive Type, Hole in Shank, Hole in Head and grip markings. A foreign part check is done on the part to determine if all the measurements are within the tolerance levels. If any of the measurements are outside of the specified regions, it is determined that this part is not a part that should be sorted, and the part will get dumped.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of inspecting unidentified mixed parts at an inspection station having a measurement axis to identify the parts, the method comprising:
   storing templates of a plurality of known good parts, each of the templates including a part profile includes a range of acceptable values and wherein each of the templates has a part identification code associated therewith;
   placing a self-supporting part to be identified on a fixtureless rotary stage using a vision-based robotic system including a robot at the inspection station so that the part axis is substantially centered and aligned with the measurement axis;
   optically measuring a profile and features of the part as the part rotates at the inspection station;
   comparing the profile and the features of the part to be identified with the profile and corresponding features of the stored templates to identify a template which matches the profile and features of the part to be identified; and
   generating and transmitting an identification signal representing the part identification code for the part associated with the matched template.

2. The method as claimed in claim 1, wherein the step of optically measuring includes the steps of:
   projecting a beam of radiation at the rotating part;
   rotating the rotary stage and the part to be identified about the measurement axis so that the rotating part stays upright to partially obstruct the beam to obtain at least one unobstructed portion of the beam of radiation; and imaging the at least one unobstructed portion of the beam of radiation to obtain a first set of electrical signals.

3. The method as claimed in claim 2, further comprising: processing the first set of electrical signals to obtain the profile and features of the part to be identified.

4. The method as claimed in claim 2, wherein the part to be identified is at least partially conductive or semiconductive, wherein a feature of at least one of the templates includes an eddy current signature and wherein the method further comprises the steps of inducing an eddy current in the rotating part, sensing the induced eddy current and comparing the eddy current signature with the sensed eddy current.

5. The method as claimed in claim 2, wherein the part to be identified partially obstructs the beam of radiation to obtain first and second unobstructed portions and wherein the first and second unobstructed portions of the beam of radiation are imaged to obtain the first set of electrical signals.

6. The method as claimed in claim 5, wherein each of the first and second unobstructed portions of the beam of radiation contain a magnitude of radiation which is representative of a respective geometric dimension of the part to be identified.

7. The method as claimed in claim 1, wherein the part to be identified has threads.

8. The method as claimed in claim 7, wherein at last one of the templates includes at least one feature related to threads.

9. The method as claimed in claim 7, wherein the part is an externally threaded fastener.

10. The method as claimed in claim 1, wherein each part axis is defined as being central to its part and parallel to its length.

11. The method as claimed in claim 1, further comprising measuring the weight of the part on the rotary stage.

12. The method as claimed in claim 1, wherein the part is made of a metal alloy and wherein the method further comprises determining the composition of the metal alloy.

13. A system for inspecting unidentified mixed parts at an inspection station having a measurement axis to identify the parts, each of the parts having a part axis, the system comprising:
an electronic storage device to store templates of a plurality of known good parts, each of the templates including a part profile and a set of features wherein each of the features includes a range of acceptable values and wherein each of the templates has a part identification code associated therewith;
a vision-based robotic subsystem including a robot configured to pick up and place a self-supporting part to be identified on a fixtureless rotary stage at the inspection station so that the part axis is substantially centered and aligned with the measurement axis;
a second subsystem to optically measure a profile and features of the part during part rotation; and
a processor operable to compare the profile and the features of the part to be identified with the profile and corresponding features of the stored templates to identify a template which matches the profile and features of the part to be identified and to generate and transmit an identification signal representing the part identification code for the part associated with the matched template.

14. The system as claimed in claim 13, wherein the second subsystem comprises:
a projector to project a beam of radiation at the rotating part;
a rotary actuator assembly to rotate the rotary stage and the self-supporting part about the measurement axis so that the rotating part stays upright to partially obstruct the beam to obtain at least one unobstructed portion of the beam of radiation; and
an imager to image the at least one unobstructed portion of the beam of radiation to obtain a first set of electrical signals.

15. The system as claimed in claim 14, wherein the processor is further operable to process the first set of electrical signals to obtain the profile and features of the part to be identified.

16. The system as claimed in claim 14, wherein the part to be identified is at least partially conductive or semiconductive, wherein a feature of at least one of the templates includes an eddy current signature and wherein the system further comprises at least one eddy current sensor to induce an eddy current in the rotating part and to sense the induced eddy current, the processor also comparing the eddy current signature with the sensed eddy current.

17. The system as claimed in claim 14, wherein the part to be identified partially obstructs the beam of radiation to obtain first and second unobstructed portions and wherein the first and second unobstructed portions of the beam of radiation are imaged to obtain the first set of electrical signals.

18. The system as claimed in claim 17, wherein each of the first and second unobstructed portions of the beam of radiation contain a magnitude of radiation which is representative of a respective geometric dimension of the part to be identified.

19. The system as claimed in claim 13, further comprising a weight sensor coupled to the rotary state to measure the weight of a part on the rotary stage.

20. The system as claimed in claim 13, wherein the part includes a metal alloy and wherein the system further comprises an x-ray fluorescence (XRF) metals analyzer to determine the composition of the metal alloy.

21. The system as claimed in claim 13, wherein the part to be identified has threads.

22. The system as claimed in claim 21, wherein at least one of the templates includes at least one feature related to the threads.

23. The system as claimed in claim 21, wherein the part is an externally threaded fastener.

24. The system as claimed in claim 13, wherein each part axis is defined as being central to its part and parallel to its length.

* * * * *

UNITED STATES PATENT AND TRADEMARK OFFICE
CERTIFICATE OF CORRECTION

PATENT NO. : 11,045,842 B2
APPLICATION NO. : 16/413696
DATED : June 29, 2021
INVENTOR(S) : Michael Nygaard et al.

Page 1 of 1

It is certified that error appears in the above-identified patent and that said Letters Patent is hereby corrected as shown below:

In the Claims

Column 25, Line 27, Claim 8:
After "as claimed in claim 7, wherein at"
Delete "last" and
Insert -- least --.

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*